US008814291B2

(12) United States Patent
Bitoh

(10) Patent No.: US 8,814,291 B2
(45) Date of Patent: Aug. 26, 2014

(54) NAIL PRINTING DEVICE AND PRINTING CONTROL METHOD THEREOF

(75) Inventor: Hiroyasu Bitoh, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 140 days.

(21) Appl. No.: 13/464,202

(22) Filed: May 4, 2012

(65) Prior Publication Data

US 2012/0287183 A1 Nov. 15, 2012

(30) Foreign Application Priority Data

May 9, 2011 (JP) ................................ 2011-104021

(51) Int. Cl.

| | |
|---|---|
| ***B41J 29/38*** | (2006.01) |
| ***A45D 29/00*** | (2006.01) |
| *B41J 2/01* | (2006.01) |
| *B41J 3/407* | (2006.01) |
| *H04N 1/034* | (2006.01) |

(52) U.S. Cl.

CPC ................ *B41J 3/407* (2013.01); *A45D 29/00* (2013.01); *A45D 2029/005* (2013.01)

USPC ...... 347/5; 347/3; 347/16; 347/101; 347/104; 347/105; 347/106

(58) Field of Classification Search

USPC .................... 347/3, 5, 16, 101, 104, 105, 106

See application file for complete search history.

(56) References Cited

U.S. PATENT DOCUMENTS

| | | | | |
|---|---|---|---|---|
| 5,309,365 | A * | 5/1994 | Sullivan et al. | 700/161 |
| 5,931,166 | A * | 8/1999 | Weber et al. | 132/73 |
| 6,035,860 | A * | 3/2000 | Mombourquette | 132/200 |
| 6,067,996 | A * | 5/2000 | Weber et al. | 132/73 |
| 6,286,517 | B1 * | 9/2001 | Weber et al. | 132/73 |
| 6,328,949 | B1 * | 12/2001 | Tessarolo et al. | 424/61 |
| 6,336,694 | B1 * | 1/2002 | Ishizaka | 347/2 |
| 6,460,958 | B2 * | 10/2002 | Kubo et al. | 347/2 |
| 6,525,724 | B1 * | 2/2003 | Takami | 345/419 |
| 6,626,183 | B1 * | 9/2003 | Pietrocola et al. | 132/73 |
| 7,123,983 | B2 * | 10/2006 | Yogo et al. | 700/182 |

(Continued)

FOREIGN PATENT DOCUMENTS

JP 2003-331355 A 11/2003

OTHER PUBLICATIONS

Weekend Nails: Heart Overload Nail Design, posted Feb. 11, 2011, at http://thiamere.blogspot.com/2011/02/weekend-nails-heart-over-load-nail.html, downloaded on Nov. 12, 2013.*

*Primary Examiner* — Laura Martin

*Assistant Examiner* — Jeremy Bishop

(74) *Attorney, Agent, or Firm* — Holtz Holtz Goodman & Chick PC

(57) ABSTRACT

A nail printing device includes a printing unit including a printing head which applies ink on a print target surface, and a control unit which controls the printing unit and sets a printing mode to a nail printing mode or a printing medium printing mode. In the nail printing mode, the control unit sets a surface of a nail portion as the print target surface and creates a nail printing image data for printing the surface of the nail portion corresponding to a curve-shape of the nail portion. In the printing medium printing mode, the control unit sets a planar surface of a printing medium as the print target surface and performs thinning correction to a nail printing image data formed corresponding to the curve-shape of the nail portion.

19 Claims, 21 Drawing Sheets

(56) References Cited

U.S. PATENT DOCUMENTS

| | | | | |
|---|---|---|---|---|
| 7,210,487 | B2 * | 5/2007 | Carsh et al. | 132/200 |
| 7,290,550 | B2 * | 11/2007 | Sim | 132/73 |
| 7,654,627 | B2 * | 2/2010 | Yajima | 347/13 |
| 2005/0151818 | A1 * | 7/2005 | Ozawa | 347/104 |
| 2005/0174367 | A1 * | 8/2005 | Kondo et al. | 347/3 |
| 2009/0153604 | A1 * | 6/2009 | Chen et al. | 347/9 |
| 2012/0113171 | A1 * | 5/2012 | Murata | 347/2 |
| 2012/0147107 | A1 * | 6/2012 | Bitoh | 347/101 |
| 2012/0147113 | A1 * | 6/2012 | Yamasaki | 347/104 |
| 2012/0274683 | A1 * | 11/2012 | Yamasaki | 347/2 |

* cited by examiner

NAIL PRINTING DEVICE AND PRINTING CONTROL METHOD THEREOF

CROSS-REFERENCE TO RELATED APPLICATIONS

This application is based upon and claims the benefit of priority from the prior Japanese Patent Application No. 2011-104021, filed on May 9, 2011, the entire contents of which are incorporated herein by reference.

BACKGROUND OF THE INVENTION

1. Field of the Invention

The present invention relates to a nail printing device and a printing control method thereof. In particular, the present invention relates to a nail printing device that applies ink onto a print target surface, and to a printing control method thereof.

2. Description of Related Art

A nail printing device is a printing device that prints an image of a nail design with a color, a pattern and the like, which are selected by a user, on a fingernail portion to be subjected to the printing.

As such a nail printing device, a device is also proposed, which prints the nail design and the like on a seal to be used by being pasted onto such a nail portion. Such a device is described, for example, in Japanese Patent Laid-Open Publication No. 2003-331355 (Patent Literature). The seal on which the nail design is printed by such a device is pasted onto the nail portion, whereby anybody can enjoy nail art easily.

Heretofore, the nail printing device as described above has been configured so that the user can confirm, on a display screen of a display unit, the nail design selected by the user before the nail design is printed on the nail portion in such a manner that, for example, a plurality of the nail designs are displayed on the display screen to thereby allow the user to select the nail design desired to be printed from the display screen, and that the selected nail design is displayed on the display screen.

This display screen is composed, for example, of a liquid crystal display (LCD) panel. In some cases, resolution of the display screen has been lower in comparison with resolution of a printing unit that performs the printing, and an image displayed on the display screen and the result actually obtained by the printing have been different from each other in color tone. Therefore, in some cases, with regard to such an actually printed result, for example, an impression thereof regarding the color tone, fineness and the like has not matched with the nail design confirmed on the display screen.

Moreover, also in such a case where the user desires to show the selected nail design to another person and to consult the person concerned whether or not the selected nail design is appropriate, then what can be done is only to confirm the nail design on the display screen, and accordingly, it has been necessary to take the person concerned to a place where the nail printing device is present.

SUMMARY OF THE INVENTION

The present invention has an advantage in being capable of providing a nail printing device that can print the nail design on the nail portion, and can confirm a finished state of a case where the nail design is printed on the nail portion by printing the finished state on a printing medium such as paper, and capable of providing a printing control method of the nail printing device.

According to an aspect of the present invention, there is provided a nail printing device which performs printing for a print target surface, including:

a printing unit which includes a printing head that applies ink on the print target surface corresponding to a printing mode, and a control unit which controls the printing unit, wherein the control unit sets the printing mode to a nail printing mode or a printing medium printing mode, in the nail printing mode, the control unit sets a surface of a nail portion as the print target surface, where the surface of the nail portion has a curve-shape that a center portion of the surface swells more than both end sides of the surface along a width direction of the surface of the nail portion, and the control unit creates a nail printing image data for printing the surface of the nail portion corresponding to the curve-shape of the surface of the nail portion, and in the printing medium printing mode, the control unit sets the planar surface of the printing medium as the print target surface, and performs thinning correction to the nail printing image data corresponding to the curve-shape of the surface of the nail portion.

According to another aspect of the present invention, there is provided a nail printing device which performs printing for a print target surface, including:

a printing unit which includes a printing head that applies ink on the print target surface corresponding to a printing mode;

a printing finger insertion portion into which a finger having a nail portion or a printing medium having a planar surface is inserted;

a photography unit which takes a photograph of a fingernail image which includes the nail portion of the finger and a part of the finger inserted into the printing finger insertion portion; and a control unit, wherein the printing finger insertion portion is made, so that a width direction of the nail portion of the finger inserted into the printing finger insertion portion is along a moving direction of the printing head where a surface of the nail portion has a curve-shape along the width direction of the surface of the nail portion, the control unit includes:

a fingernail image acquisition unit which acquires the fingernail image taken by the photography unit;

a nail region extraction unit which extracts a nail region from the fingernail image;

a positionally aligned image creation unit which positionally aligns a nail design to be printed on the nail portion with the nail region, and creates a positionally aligned image corresponding to a shape of the nail region and the curve-shape of the surface of the nail portion; and a fingernail-superimposed image creation unit which creates a fingernail-superimposed image in which the positionally aligned image is superimposed on a portion of the nail region in the fingernail image, wherein the control unit sets the printing mode to a nail printing mode or a printing medium printing mode, and in the nail printing mode, the control unit sets the surface of the nail portion as the print target surface, and in the printing medium printing mode, the control unit sets the planar surface of the printing medium as the print target surface, and performs thinning correction to the positionally aligned image in the fingernail-superimposed image corresponding to the curve-shape of the surface of the nail portion.

According to still another aspect of the present invention, there is provided a printing control method of a nail printing device which performs printing for a print target surface, including:

setting a printing mode to a nail printing mode or a printing medium printing mode, applying ink on the print target surface by forming a plurality of ink-dots corresponding to the printing mode, in the nail printing mode, setting the surface of the nail portion as the print target surface where the surface of the nail portion has a curve-shape that a center portion of the surface swells more than both end sides of the surface along a width direction of the nail portion, and creating a nail printing image data for printing the surface of the nail portion corresponding to the curve-shape of the surface of the nail portion, in the printing medium printing mode, setting the planar surface of the printing medium as the print target surface, performing a thinning correction to the nail printing image data corresponding to the curve-shape of the surface of the nail portion.

According to still another aspect of the present invention, there is provided a printing control method of a nail printing device which performs printing for a print target surface, including:

setting a printing mode to a nail printing mode or a printing medium printing mode, applying ink on the print target surface by a printing head corresponding to the printing mode, in the nail printing mode, setting a surface of a nail portion of a finger as the print target surface where the surface of the nail portion has a curve-shape that a center portion of the surface swells more than both end sides of the surface along a width direction of the nail portion, taking a photograph of the finger including the nail portion, acquiring a fingernail image including the nail portion and a part of the finger, extracting a nail region from the fingernail image corresponding to the nail portion, creating a positionally aligned image corresponding to a shape of the nail region and the curve-shape of the surface of the nail portion by positionally aligning a nail design to be printed on the nail portion with the nail region, and applying the ink on the surface of the nail portion corresponding to the positionally aligned image while moving a printing head along the width direction, in the printing medium printing mode, setting the planar surface of the printing medium as the print target surface, creating a fingernail-superimposed image in which the positionally aligned image is superimposed on a portion of the nail region in the fingernail image, performing a thinning correction to the positionally aligned image in the fingernail-superimposed image corresponding to the curve-shape of the surface of the nail portion, and applying the ink on the planar surface of the printing medium corresponding to the fingernail-superimposed image including the positionally aligned image for which the thinning correction is performed.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 19A is a schematic view showing the printing finger before the printing; FIG. 19B is a schematic view showing the printing finger in a state where underlying ink is printed thereon; and FIG. 19C is a schematic view showing the printing finger in a state where color ink is printed thereon;

FIG. 20A is a schematic view showing the printing finger before the printing; FIG. 20B is a schematic view showing the printing finger in a state where the underlying ink is printed thereon; and FIG. 20C is a schematic view showing the printing finger in a state where the color ink is printed thereon;

DETAILED DESCRIPTION OF THE PREFERRED EMBODIMENT

A description is made below in detail of a nail printing device according to the present invention and a printing control method thereof by showing an embodiment.

Figure 1:
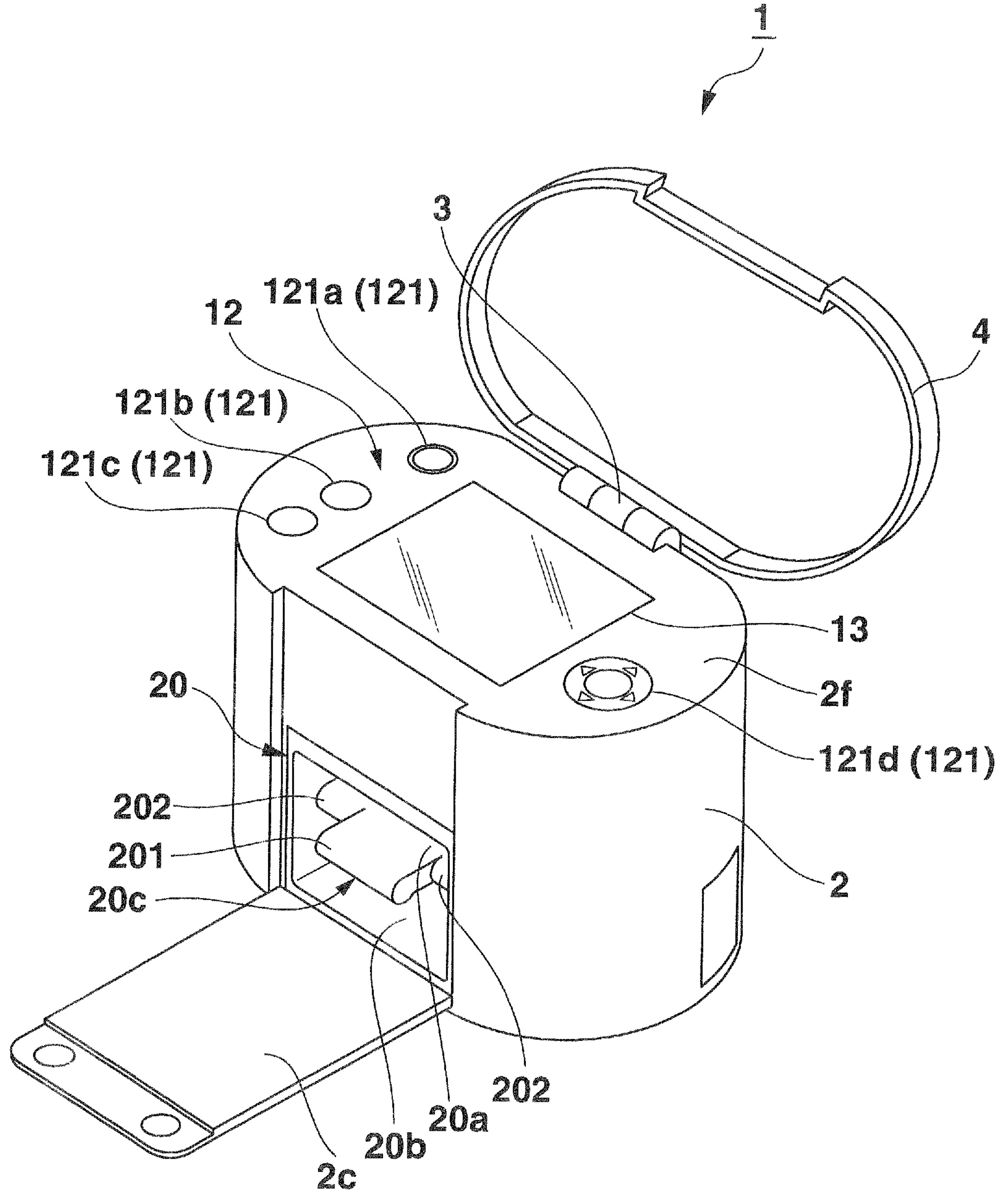
FIG. 1 is a perspective view showing an exterior appearance of a nail printing device in an embodiment of the present invention.

FIG. 1 is a perspective view showing an exterior appearance of a nail printing device in this embodiment.

Figure 2:
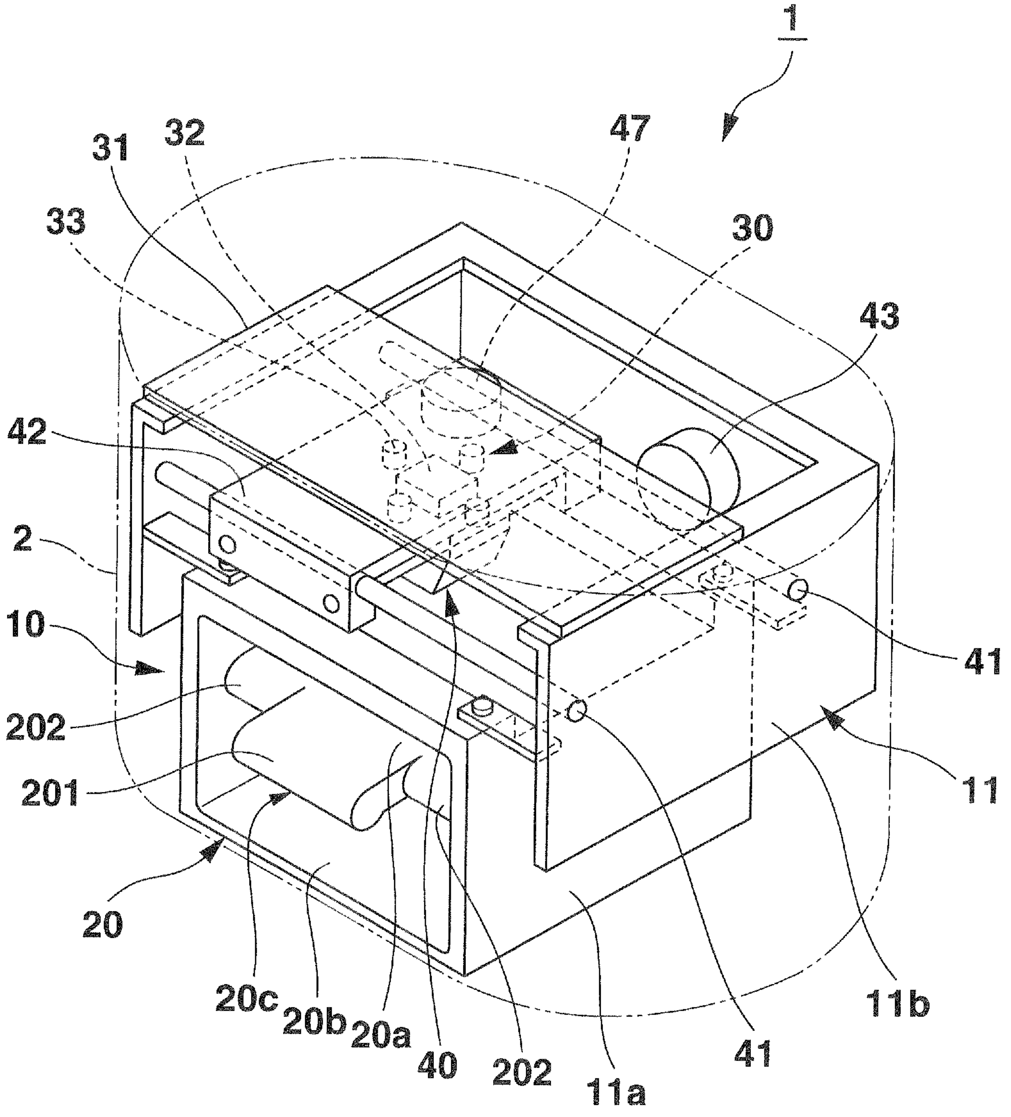
FIG. 2 is a perspective view showing an internal structure of a device body of the nail printing device in this embodiment.

FIG. 2 is a perspective view showing an internal configuration of the nail printing device in this embodiment.

In this embodiment, the nail printing device 1 can print images of a variety of nail designs and the like on a surface of a fingernail portion. Moreover, the nail printing device 1 of this embodiment can print fingernail-superimposed images, in which the same patterns, nail designs and the like as those implemented for such a nail portion are superimposed on a nail region of a printing finger U1 of a user, on a printing medium (in this embodiment, a trial printing sheet 8 (refer to FIG. 5 and the like).

That is to say, before being actually printed on the nail portion, such a fingernail-superimposed image is printed as trial printing on the printing medium, and the fingernail-superimposed image printed on the printing medium is seen, whereby an impression when the selected nail design is actually printed can be easily confirmed. Moreover, by this printing medium, the nail design can be shown to another person.

In this embodiment, the fingernail portion and the printing medium compose print target objects, and the surface of the fingernail portion and a printing surface as an upper surface of the printing medium (trial printing sheet 8) compose printing target surfaces.

As shown in FIG. 1 and FIG. 2, the nail printing device 1 includes: a device body 10; a trial printing sheet holding member (printing medium holding member) 6 (refer to FIG. 6, FIG. 7 and the like, which will be described later). The device body 10 includes: a case body 2; a lid body 4; a printing finger insertion portion 20*a*; and the like. The printing finger insertion portion 20*a* composes a print target object insertion portion into which a finger (printing finger U1) corresponding to the nail portion serving as the print target object and the trial printing sheet holding member 6 that holds the trial printing sheet 8 are inserted.

The trial printing sheet holding member 6 is composed so as to be insertable into and detachable from the printing finger insertion portion 20*a*.

In this embodiment, the case body 2 and the lid body 4 are coupled to each other through a hinge 3 provided on a rear end portion of an upper surface of the case body 2.

The case body 2 described above is formed, for example, into an ellipsoidal shape when viewed from the above. On a front side of the case body 2, an open/close plate 2*c* is provided so as to be capable of rising and falling. This open/close plate 2*c* is coupled to the case body 2 through a hinge (not shown) provided on a lower end portion of a front surface of the case body 2. This open/close plate 2*c* is a plate for opening/closing the front surface of the case body 2.

On a top plate 2*f* of the case body 2, an operation unit 12 and a display unit 13, which will be described later, are installed.

Note that shapes and configurations of the case body 2 and the lid body 4 are not limited to those illustrated here.

In the case body 2, the device body 10 of the nail printing device 1 is housed.

This device body 10 includes: a printing finger fixing unit 20 that is shown in FIG. 2 composing a printing finger fixing unit; a photography unit 30 that is shown in FIG. 2 composing a photography unit; a printing unit 40 that is shown in FIG. 2 composing a printing unit; and a control device 50 (refer to FIG. 10) composing a control unit.

The printing finger fixing unit 20, the photography unit 30, the printing unit 40 and the control device 50 are provided on a machine casing 11.

Note that the machine casing 11 is composed of a lower machine casing 11*a* and an upper machine casing 11*b*.

Then, the lower machine casing 11*a* is formed into a box shape, and is installed in a lower portion of an inside of the case body 2, and the upper machine casing 11*b* is installed above the lower machine casing 11*a* and an upper portion in the inside of the case body 2.

The printing finger fixing unit 20 is provided in the lower machine casing 11*a* in the machine casing 11. The printing finger fixing unit 20 is composed of the printing finger insertion portion 20*a*, a non-printing finger insertion portion 20*b* and a grip portion 20*c*, which are provided in the lower machine casing 11*a*.

Here, the printing finger insertion portion 20*a* is a finger insertion portion (refer to FIG. 3) for receiving insertion of such fingers (hereinafter, referred to as "printing fingers") U1 corresponding to nail portions T to be subjected to the printing.

The non-printing finger insertion portion 20*b* is a finger insertion portion for receiving insertion of a finger (hereinafter, referred to as "a non-printing finger") U2 other than the printing fingers (refer to FIG. 3).

The grip portion 20*c* is a portion capable of being sandwiched by the printing fingers U1 inserted into the printing finger insertion portion 20*a* and the non-printing finger U2 inserted into the non-printing finger insertion portion 20*b*. In this embodiment, this grip portion 20*c* is composed of a partition 21 that partitions the printing finger insertion portion 20*a* and the non-printing finger insertion portion 20*b* from each other.

An upper surface of this grip portion 20*c* composes a flat printing finger mounting surface. A swelling portion 22 is formed on a finger insertion-side end portion of this partition 21. This swelling portion 22 is formed at a portion against which a base U3 of the printing fingers U1 and the non-printing finger U2 abuts in the event where the printing fingers U1 and the non-printing finger U2 are deeply inserted into the printing finger insertion portion 20*a* and the non-printing finger insertion portion 20*b*. In the swelling portion 22, a cross section thereof in a finger insertion direction is formed into a circular shape so as to swell downward from a lower surface of the grip portion 20*c* in order that the grip portion 20*c* can be strongly sandwiched by the printing fingers U1 and the non-printing finger U2 in a state where the whole of the cushions of the printing fingers U1 abuts against the printing finger mounting surface. Note that the shape of the swelling portion 22 is not limited to the circular shape in cross section, and may be a noncircular shape in cross section, such as ellipsoidal and polygonal shapes in cross section.

Figure 3:
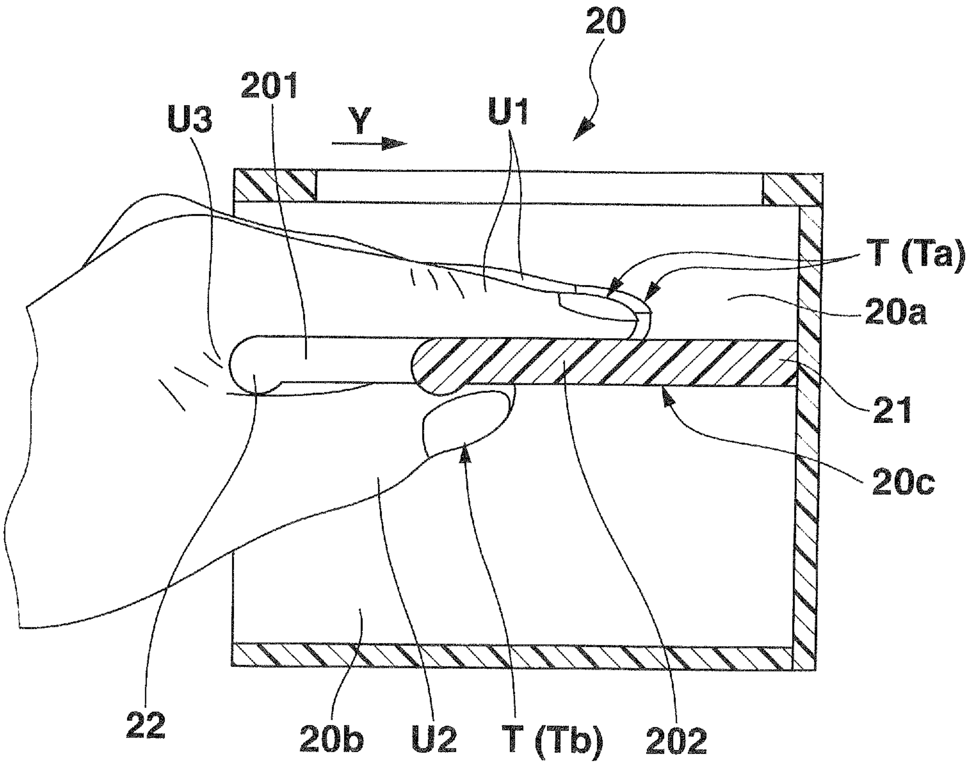
FIG. 3 is a view specifically showing an example of a fixing mode of printing fingers in a case where four fingers other than a thumb in a left hand become the printing fingers in the nail printing device in this embodiment.

FIG. 3 is a view specifically showing an example of a fixing mode of the printing fingers U1 in the case where four fingers (forefinger, middle finger, ring finger and little finger) other than a thumb in a left hand become the printing fingers U1.

In this case, as shown in FIG. 3, the user sandwiches the grip portion 20*c* by the printing fingers U1 inserted into the printing finger insertion portion 20*a* and by the non-printing finger U2 inserted into the non-printing finger insertion portion 20*b*, whereby the printing fingers U1 are fixed on the grip portion 20*c*.

As shown in FIG. 1, FIG. 2 and the like, in this embodiment, on a center portion in a width direction of the grip portion 20*c*, a first finger positioning portion 201 is arranged. The base U3 of the four fingers which are the forefinger to the little finger as the printing fingers U1 inserted into the printing finger insertion portion 20*a* and of the other finger (that is, the thumb) as the non-printing finger U2 inserted into the non-printing finger insertion portion 20*b* is thrust against an end portion of the first finger positioning portion 201, whereby it is made possible to position the four fingers which are the forefinger to the little finger.

In this embodiment, a length dimension in a width direction of the first finger positioning portion 201 is set substantially equal to or a little larger than a dimension of a right-and-left width of the four fingers as the forefinger to the little finger, which are inserted into the printing finger insertion portion 20*a*.

Moreover, in the grip portion 20*c*, on both right and left sides of the first finger positioning portion 201, second finger positioning portions 202 are arranged. The base U3 of the thumb as the printer finger U1 inserted into the printing finger insertion portion 20*a* and of the other fingers (that is, four fingers which are the forefinger to the little finger) as the non-printing fingers U2 inserted into the non-printing finger insertion portion 20*b* is thrust against an end portion of each of the second finger positioning portions 202, whereby it is made possible to position the thumb inserted into the printing finger insertion portion 20*a*.

In each of the second finger positioning portions 202, the end portion thereof is arranged at a position shifted to a deeper side in an insertion direction (Y-direction) of the printing fingers than the end portion of the first finger positioning portion 201. To which extent the end portions of the second finger positioning portions 202 are shifted with respect to the end portion of the first finger positioning portion 201 is not particularly limited; however, it is preferable to arrange the end portions of the first finger positioning portion 201 and of the second finger positioning portions 202 at such positions where a nail portion Tb of the thumb and respective nail portions Ta of the other four fingers are arrayed at substantially the same positions in the insertion direction.

In terms of this point, in a human hand, the thumb is shorter in comparison with the other four fingers, and the thumb and the other four fingers have a length difference of 40 to 75 mm therebetween though the difference varies among individuals and depending on a gripping manner. In this connection, in consideration of such a length difference between the fingers, it is preferable that the end portions of the second finger positioning portions 202 be shifted to the deeper side in the insertion direction of the printing fingers U1 by approximately 40 to 75 mm than the end portion of the first finger positioning portion 201.

Figure 4A:
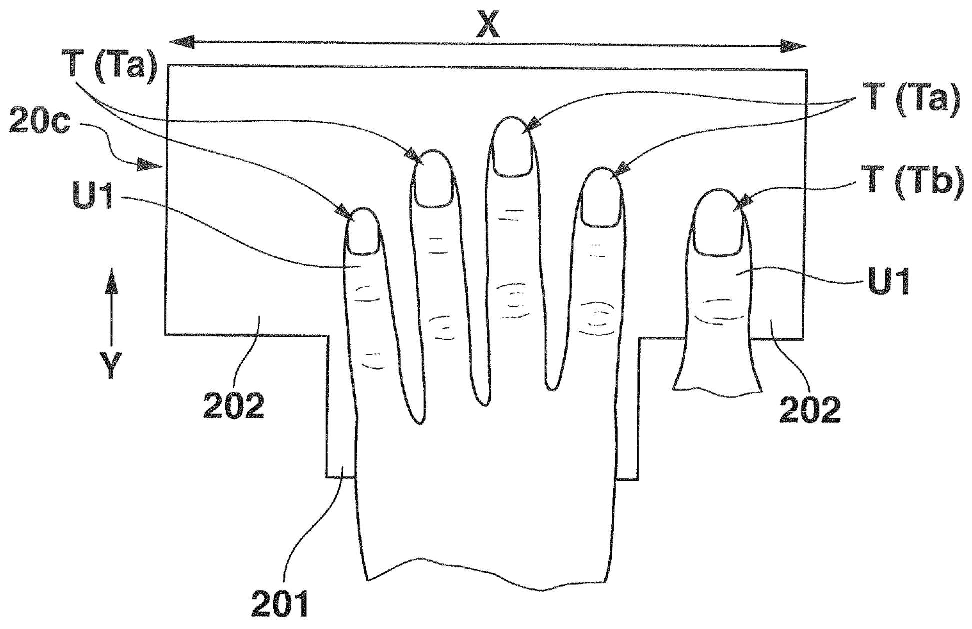
FIG. 4A is a view showing a state where the four fingers of the left hand are positioned at a first finger positioning portion of a grip portion, and showing a state where a thumb of a right hand is positioned at a second finger positioning portion thereof.
Figure 4B:
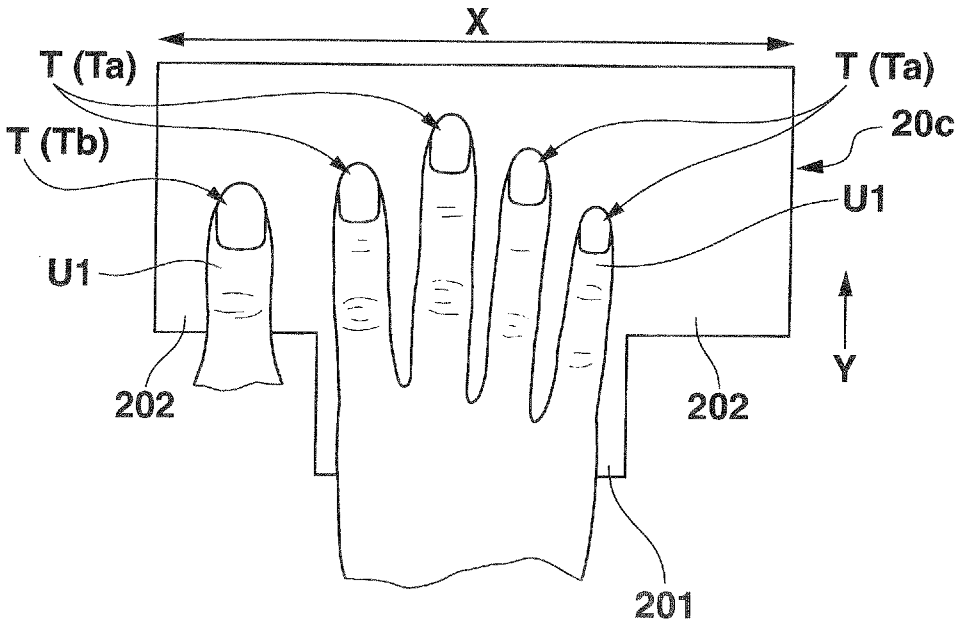
FIG. 4B is a view showing a state where four fingers of the right hand are positioned at the first finger positioning portion of the grip portion, and showing a state where a thumb of the left hand is positioned at the second finger positioning portion thereof.

FIG. 4A is a view showing a state where the four fingers (forefinger, middle finger, ring finger and little finger) of the left hand are positioned at the first finger positioning portion 201 of the grip portion 20*c*, and showing a state where the thumb of the right hand is positioned at the second finger positioning portion 202 arranged on a right side of this first finger positioning portion 201. FIG. 4B is a view showing a state where the four fingers (forefinger, middle finger, ring finger and little finger) of the right hand are positioned at the first finger positioning portion 201 of the grip portion 20*c*, and showing a state where the thumb of the left hand is positioned at the second finger positioning portion 202 arranged on a left side of this first finger positioning portion 201.

In this embodiment, as shown in FIG. 4A and FIG. 4B, a case is illustrated, where the end portions of the second finger positioning portions 202 are shifted, for example, by approximately 45 mm to the deeper side in the insertion direction of the printing fingers U1 than the end portion of the first finger positioning portion 201.

In the case where the end portion of the portion of positioning the four fingers and the end portion of each portion of positioning the thumb is not shifted from each other in the insertion direction Y of the printing fingers U1, then the position of the nail portion Tb of each thumb and the positions of the respective nail portions Ta of the other four fingers are largely shifted from each other in the insertion direction of the printing fingers U1. In this case, it is necessary that an photography-enabled region capable of being taken a photograph by the photography unit 30 to be described later and a printing-enabled region capable of being printed by the printing unit 40 to be described later be expanded to a region including all of the nail portion Tb of the thumb and the nail portions Ta of the other four fingers.

As opposed to this, in this embodiment, the end portion of the second finger positioning portion 202 of positioning each thumb is shifted, for example, by approximately 45 mm, to the deeper side in the insertion direction of the printing fingers than the end portion of the first finger positioning portion 201. Accordingly, the positions of the thumb Tb and the respective nail portions Ta of the other four fingers in the insertion direction of the printing fingers are substantially aligned with each other. Therefore, the photography-enabled region by the photography unit 30 and the printing-enabled region by the printing unit 40 can be made relatively narrow.

Subsequently, in this embodiment, as mentioned above, it is made possible to insert the trial printing sheet holding member (printing medium holding member) 6, which holds the trial printing sheet 8 (refer to FIG. 5 and the like) as the printing medium on the upper surface thereof, into the printing finger insertion unit 20*a*, and to print, on the trial printing sheet 8 concerned, the same pattern, nail design and the like as those implemented for the nail portions.

Here, a description is made of the trial printing sheet 8 in this embodiment and the trial printing sheet holding member 6 that holds the same while referring to FIG. 1 and FIG. 5 to FIG. 7.

Figure 5:
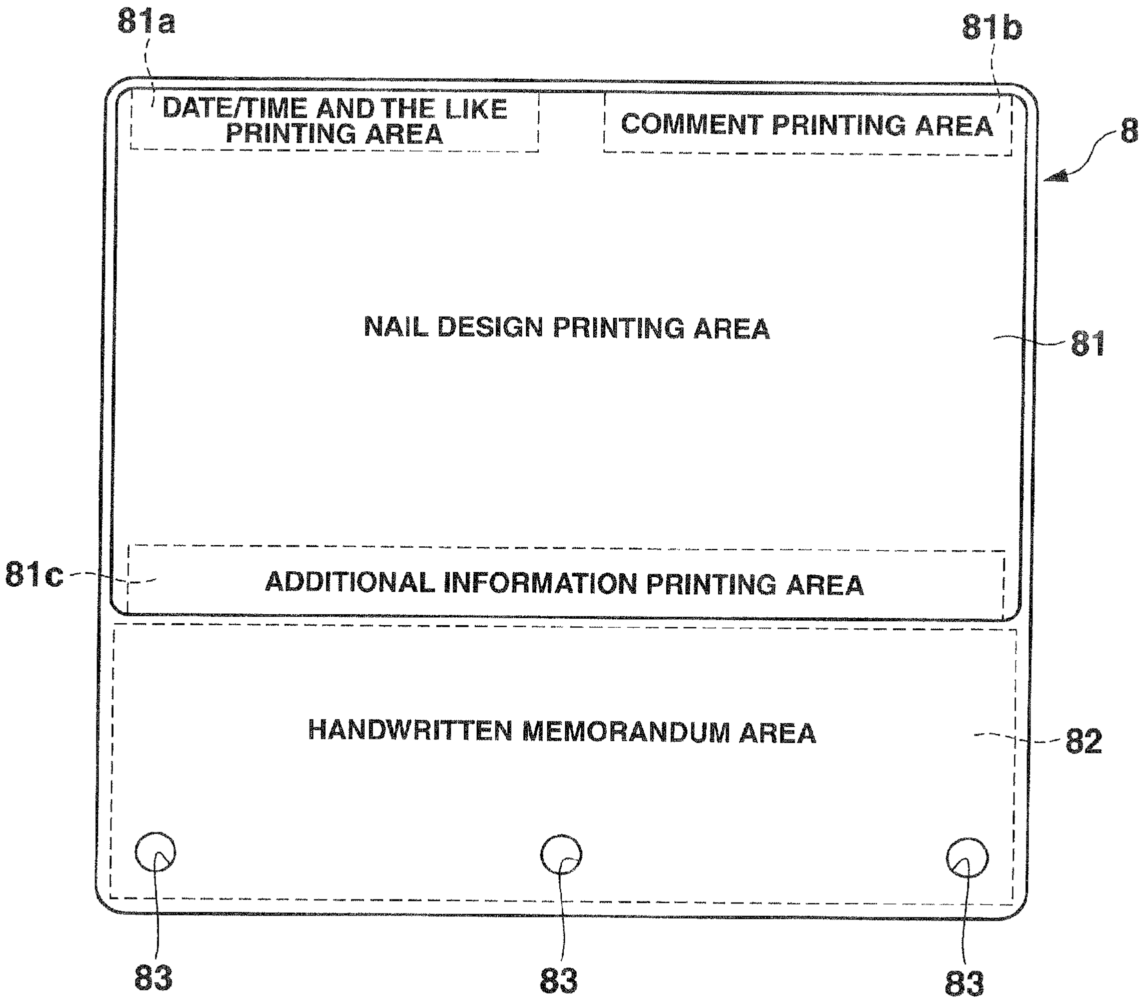
FIG. 5 is a plan view of a trial printing sheet in this embodiment.

FIG. 5 is a plan view of the trial printing sheet when viewed from the above (printed surface side).

Figure 6:
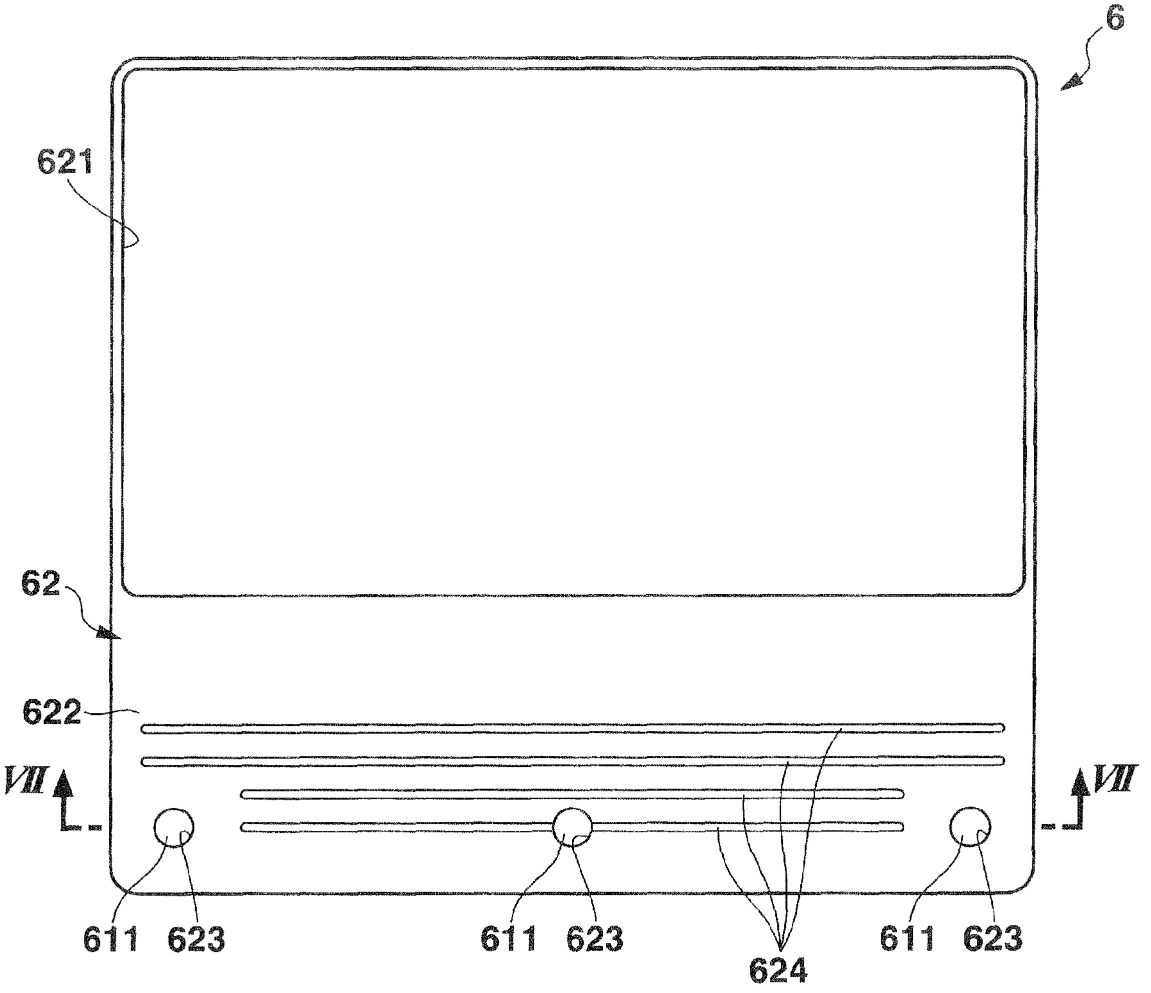
FIG. 6 is a plan view of a trial printing sheet holding member in this embodiment.

FIG. 6 is a plan view of the trial printing sheet holding member 6 when viewed from the above (side opposed to the printing unit in the event where the trial printing sheet holding member 6 is inserted into the printing finger insertion portion 20*a*).

Figure 7:
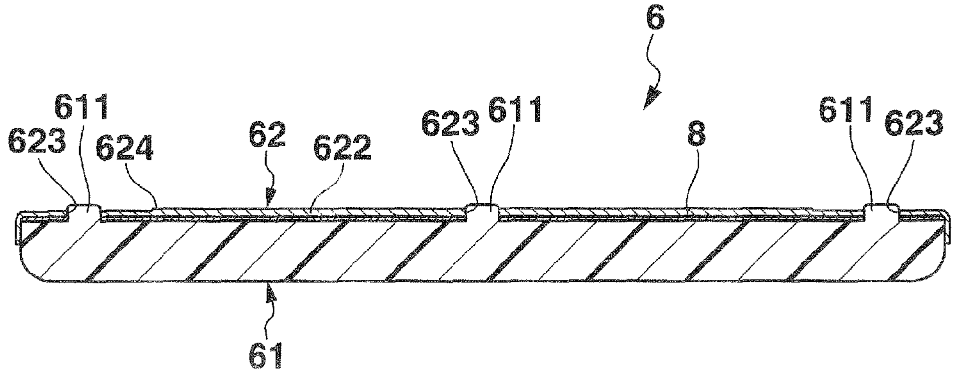
FIG. 7 is a cross-sectional view of the trial printing sheet holding member, taken along a line VII-VII of FIG. 6.

FIG. 7 is a cross-sectional view of the trial printing sheet holding member 6, taken along a line VII-VII of FIG. 6.

In the following, a side located on a depth side in the insertion direction in the event where the trial printing sheet holding member 6 that holds the trial printing sheet 8 is inserted into the printing finger insertion unit 20*a* is referred to as a "depth side", and a side located on a front side (that is, an insertion port side) in the insertion direction in that event is referred to as a "front side".

As shown in FIG. 5, in this embodiment, in matching with a shape of the printing finger insertion portion 20*a*, the trial printing sheet 8 has a rectangular shape in which a length dimension in a width direction is a little larger than a length dimension in the insertion direction into the printing finger insertion portion 20*a*.

As the trial printing sheet 8 as the printing medium, there are applicable various types of paper such as, for example, plain paper, recycled paper, glossy paper, and paper obtained by coating resin and the like on a surface of usual paper.

Note that a material of the printing medium just needs to be printable by the printing unit 40 of the nail printing device 1, and is not limited to the paper. For example, the printing medium may be made of various materials such as, for example, resin, metal and glass. Moreover, a thickness and the like of the printing medium are not particularly limited. The nail printing device 1 may be made capable of coping with printing mediums with varieties of materials and thicknesses.

As shown in FIG. 5, a region of substantially a half from the depth side of the trial printing sheet 8 is a nail design printing area 81 to be subjected to the printing by the printing unit 40.

On a center portion of the nail design printing area 81, one or plural nail designs D selected by the user are printed.

Figure 21:
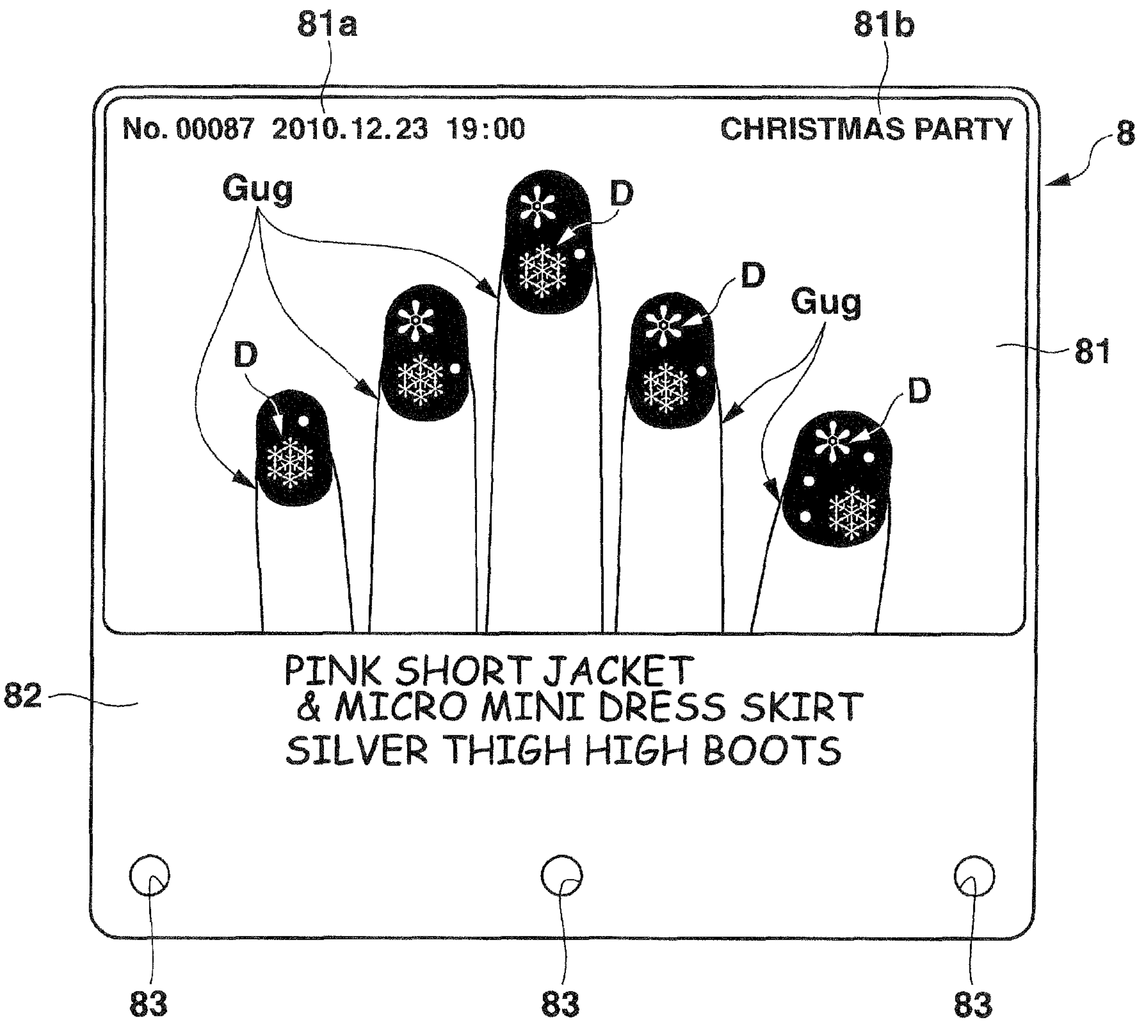
FIG. 21 is a plan view showing an example of the trial printing sheet in this embodiment.

Moreover, one end side on the deepest side of the nail design printing area 81 is a date/time and like printing area 81*a* on which a date/time, a design number of such a nail design D to be printed, and the like are printed. For example, in the case where the design number of the nail design D to be printed is "No. 00087", and such a printing date/time is "19 o'clock, Dec. 23, 2010", then on the date/time and like printing area 81*a*, letters "No. 00087 2010.12.23 19:00" are automatically printed as shown in FIG. 21. Note that, though a date/time at the point of printing time indicated by a timepiece function inherent in the control device 50 is set as a default of the date/time to be printed on the date/time and like printing area 81*a*, it is also possible for the user to arbitrarily set/change the data/time concerned.

Moreover, other end side on the deepest side of the nail design printing area 81 is a comment printing area 81*b* on which a comment is printed. For example, in the case where the nail design D to be printed on the trial printing sheet 8 is for a Christmas party, when the user inputs a comment to this effect, then as shown in FIG. 21, letters "Christmas party" are printed on the comment printing area 81*b*.

Figure 23:
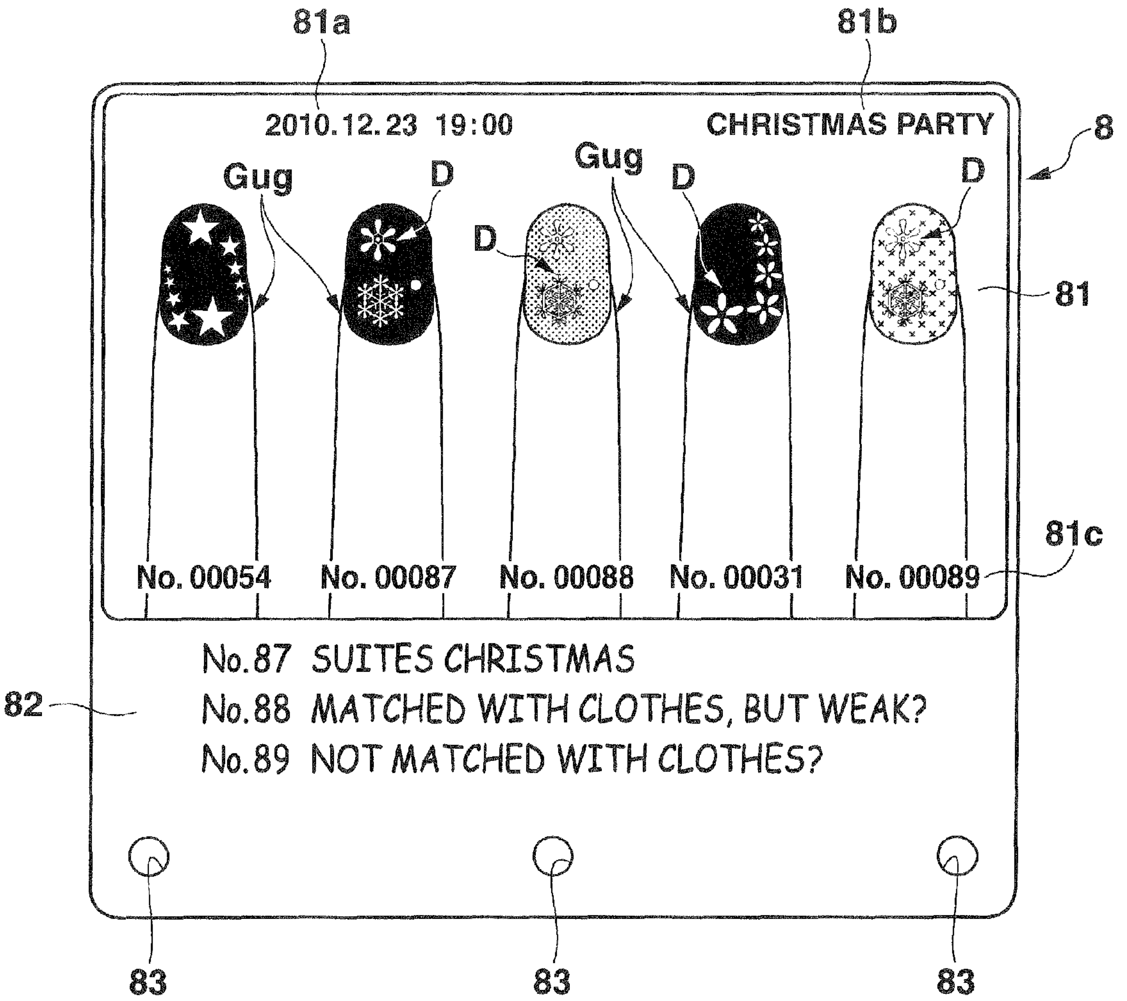
FIG. 23 is a plan view showing another example of the trial printing sheet in this embodiment.
Figure 24:
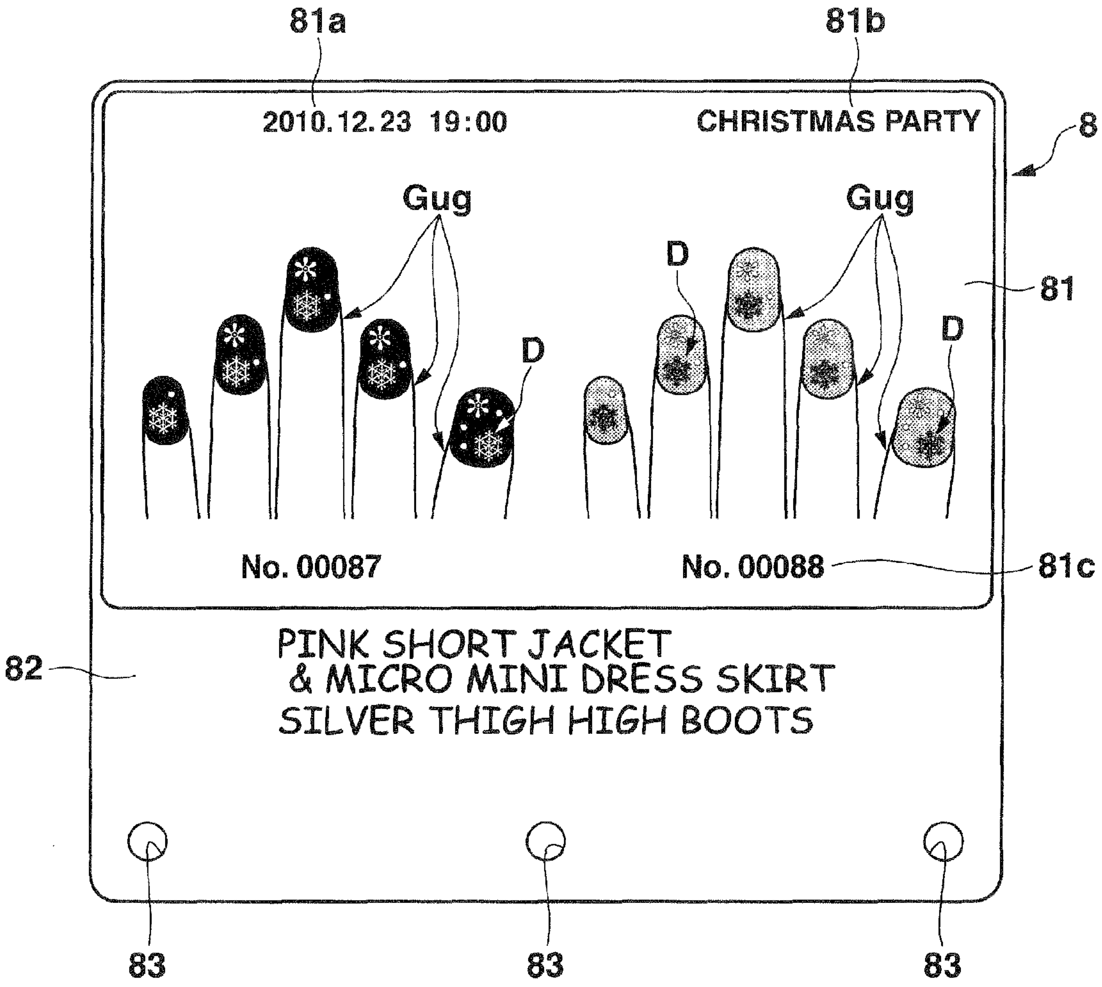
FIG. 24 is a plan view showing another example of the trial printing sheet in this embodiment.

A front side of the nail design printing area 81 is an additional information printing area 81*c* on which additional information can be printed. The additional information printing area 81*c* is used in the case where there is a comment that cannot be contained in the comment printing area 81*b* in terms of length, in the case where a comment is desired to be added to each image in the nail design printing area 81, and the like. For example, as shown in FIG. 23 and FIG. 24, which will be described later, in the case where the plurality of nail designs D are printed in line on the one trial printing sheet 8, the design number of each nail design D can be printed as the additional information on the additional information printing area 81*c*. As described above, the additional information is printed in advance, whereby a design number of a favorite nail design D can be easily confirmed when the trial printing sheet 8 subjected to the printing is seen later on.

The date/time and like printing area 81*a*, the comment printing area 81*b* and the additional information printing area 81*c* are provided on portions such as the end portions in the nail design printing area 81, which do not hinder the images of the printing fingers U1, the images of the nail designs D, and the like.

Note that the nail design printing area 81 just needs to be located within a printing-enabled range by the printing unit 40, and a size, position and the like thereof are not particularly limited. Moreover, it is not always necessary that the date/time and like printing area 81*a*, the comment printing area 81*b* and the additional information printing area 81*c* be provided on the nail design printing area 81. Moreover, it is not necessary that the printing be implemented for all of these, and the user and the like may be capable of arbitrarily setting areas to be subjected to the printing, items to be printed, and the like.

A region more on a front side than the nail design printing area 81 in the trial printing sheet 8 is a handwritten memorandum area 82 on which the user can freely write letters and the like.

On the handwritten memorandum area 82, for example, as shown in FIG. 21 to FIG. 24, which will be described later, dress scheduled to be matched with the nail design D concerned, a feeling of the user, a comment of the user and the like can be handwritten by a pen and the like.

In this handwritten memorandum area 82, in the vicinity of the end portion on the front side of the trial printing sheet 8, three engagement holes 83 for fixing the trial printing sheet 8 to a predetermined position on the trial printing sheet holding member 6 are provided substantially in line, for example, in the width direction.

A size and number of the engagement holes 83 and positions/interval and the like at which the engagement holes 83 are provided are not particularly limited, and for example, two engagement holes 83 may be provided on both end sides on the front side of the trial printing sheet 8.

It is not essential for the present invention to provide the engagement holes 83, and a configuration may be adopted, in which the trial printing sheet 8 is fixed onto the trial printing sheet holding member 6 without providing the engagement holes 83.

Note that, for example, the positions/interval and the like of the engagement holes 83 are matched with positions/interval and the like of a binding tool such as paper rings and exclusive binder and file (any is not shown) for binding and storing the trial printing sheet 8, whereby the engagement holes 83 may be made usable as binding holes in the event where the trial printing sheet 8 is bound and stored in the file or the like after the printing.

In this embodiment, the trial printing sheet holding member 6 that holds the trial printing sheet 8 is formed into shape/size which enable the trial printing sheet holding member 6 concerned to be taken in to and out from the printing finger insertion portion 20*a*.

As shown in FIG. 6 and FIG. 7, the trial printing sheet holding member 6 includes: a holding portion body 61; and a cover member 62 to be covered thereon after the trial printing sheet 8 is held on this holding portion 61.

The trial printing sheet holding member 6 is a printing medium holding portion that holds the trial printing sheet 8 as the printing medium in a flat state, and in addition, in the event of performing the printing according to a printing medium printing mode, holds the trial printing sheet 8 at a position where a distance between the printing unit 40 and the surface of the printing medium at the time of the printing according to this printing medium printing mode becomes substantially equal to a distance between the printing unit 40 and the surface of the nail portion T of the printing finger U1 at a time of printing according to a nail printing mode.

The trial printing sheet holding member 6 has some thickness. Then, the thickness of the trial printing sheet holding member 6 is set at a thickness in which, in the event where the trial printing sheet holding member 6 is inserted into the printing finger insertion portion 20*a* in the state where the trial printing sheet holding member 6 concerned holds the trial printing sheet 8, a distance between the printed surface of the trial printing sheet 8 and a printing head 46 of the printing unit 40 becomes substantially equal to the distance between the surface of the nail portion T of the printing finger U1 and the printing head 46 in the event where the printing finger U1 is inserted into the printing finger insertion portion 20*a*.

The holding portion body 61 is a plate-like member molded, for example, of resin and the like. Note that a material for forming the holding portion body 61 is not limited to the resin. An upper surface of the holding portion body 61 is formed to a size substantially equal to or a little larger than a size of the trial printing sheet 8, and is made so that the trial printing sheet 8 held on the holding portion body 61 cannot hang out from the holding portion body 61.

In the vicinity of an end portion on a front side of the holding portion body 61, at positions corresponding to the engagement holes 83 of the trial printing sheet 8, three engagement projections 611 for engaging the trial printing sheet 8 are provided, for example, substantially in line in the width direction.

The trial printing sheet 8 is positioned at and fixed to a predetermined position on the trial printing sheet holding member 6 in such a manner that the engagement projections 611 of the holding portion body 61 are individually fitted to the engagement holes 83.

The cover member 62 is a member that fixes the trial printing sheet 8 in a flat state, where four sides thereof are stretched, by being covered on the holding portion body 61 after the trial printing sheet 8 is held on the holding portion body 61. By covering the cover member 62, warp and swell of the trial printing sheet 8 are prevented, and the printing can be performed in a good state.

The cover member 62 is formed of a metal material, for example, such as stainless steel and aluminum, and of the like. Note that a material for forming the cover member 62 is not limited to the metal material.

In the cover member 62, an opening portion 621 is formed at a position corresponding to the nail design printing area 81 of the trial printing sheet 8, and even in a state where the cover member 62 is covered on the holding portion body 61, the nail design printing area 81 of the printed surface of the trial printing sheet 8 is exposed from this opening portion 621.

In the cover member 62, a portion thereof corresponding to the handwritten memorandum area 82 of the trial printing sheet 8 in the event where the cover member 62 is covered on the holding portion body 61 is a coating portion 622 that coats the printed surface of the trial printing sheet 8.

In the vicinity of an end portion on a front side of this coating portion 622, at positions corresponding to the engagement projections 611 of the holding portion body 61, three fitting holes 623 to be fitted to the engagement projections 611 are formed.

After the engagement holes 83 of the trial printing sheet 8 are engaged with the engagement projections 611 of the holding portion body 61, the fitting holes 623 of the cover member 62 are fitted from the above individually to the engagement projections 611. In such a way, between the holding portion body 61 and the cover member 62, the trial printing sheet 8 can be sandwiched, positioned and fixed, and a positional shift therebetween can be surely prevented.

On a surface of this coating portion 622, a non-slip treated portion 624 subjected to treatment for adding irregularities on a surface thereof, for example, such as embossing treatment is formed. By this non-slip treated portion 624, the fingers of the user are likely to be caught in the event where the trial printing sheet holding member 6 is taken in to and out from the printing finger insertion portion 20*a*, and the fingers become less likely to slip. Note that such non-slip treatment to be implemented for the surface of the trial printing sheet holding member 6 is not limited to the embossing treatment. For example, a slip-proof sheet or the like may be pasted onto an upper surface of the coating portion 622.

Figure 8:
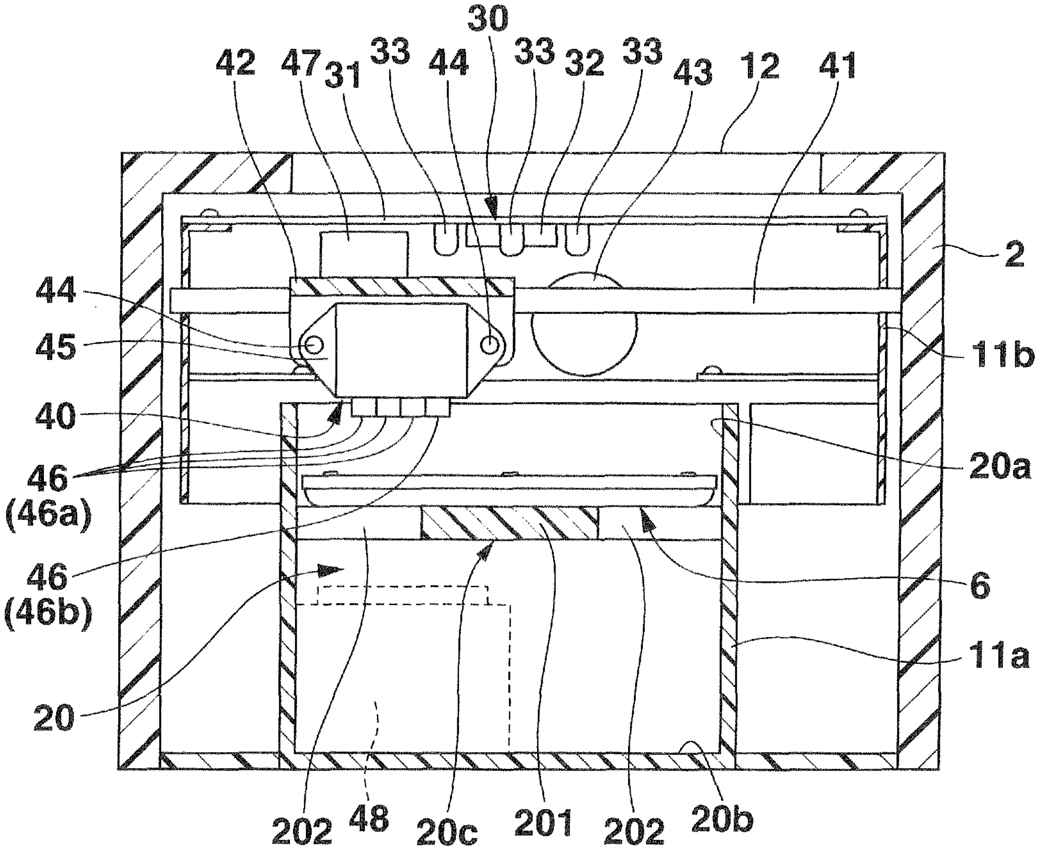
FIG. 8 is a cross-sectional view of a front side of the nail printing device according to this embodiment.

FIG. 8 is a cross-sectional view of the front side of the nail printing device 1 according to this embodiment.

Figure 9:
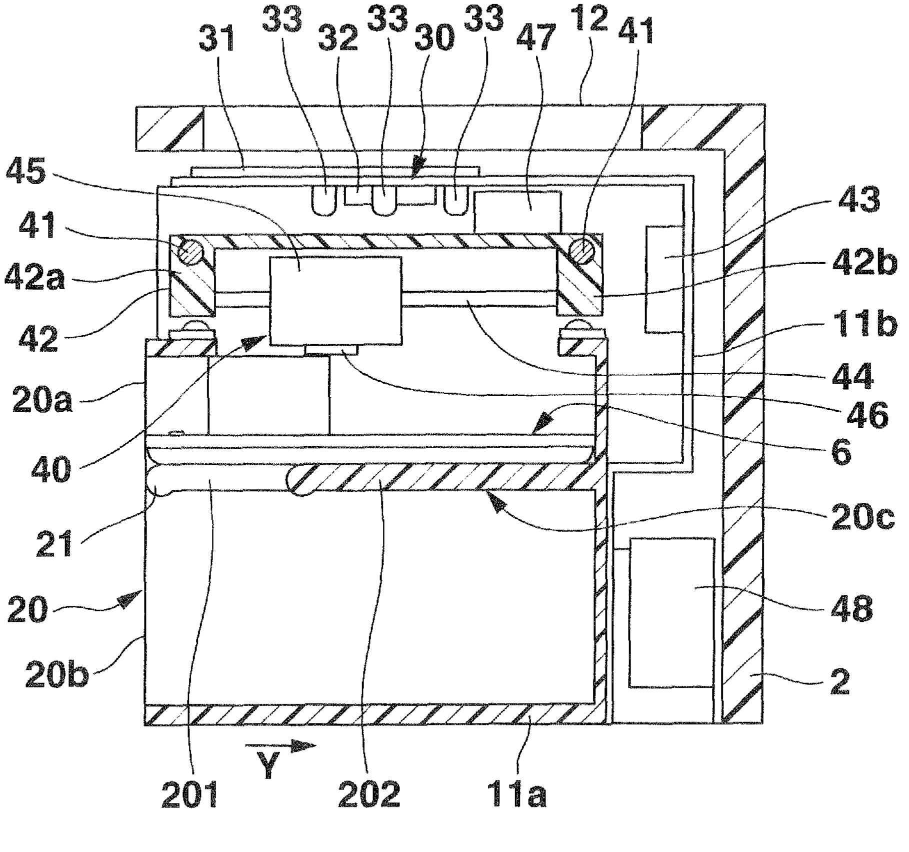
FIG. 9 is a side cross-sectional view of the nail printing device according to this embodiment.

FIG. 9 is aside cross-sectional view of the nail printing device 1 according to this embodiment.

FIG. 8 and FIG. 9 show a state where the trial printing sheet holding member 6 is inserted into the printing finger insertion portion 20*a*.

As shown in FIG. 8 and FIG. 9, the photography unit 30 is provided in the upper machine casing 11*b* in the machine casing 11. On a lower surface of a center portion of a board 31 installed in the upper machine casing 11*b*, a camera 32 is installed, which has a driver built therein, and has, for example, approximately 2 million pixels or more.

On the board 31, illumination lamps 33 such as white LEDs are installed so as to surround the camera 32. The photography unit 30 is composed by including the camera 32 and the illumination lamps 33.

The photography unit 30 illuminates such printing fingers U1 by the illumination lamps 33, takes a photograph of the printing fingers U1 concerned by the camera 32, and captures an image thereof. In this embodiment, the photography unit 30 functions as a fingernail image acquisition unit that takes a photograph of the fingers (printing fingers U1), and acquires a fingernail image including nail regions At of the nail portions T corresponding to the printing fingers U1 and a part of the printing fingers U1.

This photography unit 30 is connected to a control unit 51 of the control device 50 to be described later, and is controlled by the control unit 51.

In this embodiment, the printing fingers U1 inserted into the printing finger insertion portion 20*a* and the trial printing sheet holding member 6 are photographed by the camera 32 of the photography unit 30.

For example, based on the image photographed by the photography unit 30, the control unit 51 determines whether or not the printing fingers U1 and the trial printing sheet holding member 6 are inserted into the printing finger insertion portion 20*a*.

The printing unit 40 is provided mainly in the upper machine casing 11*b*.

In this embodiment, as will be described later, the printing unit 40 performs the printing for the trial printing sheet 8 as well as implements the printing for the nail portions T (nail portions Ta of the four fingers in one hand, and a nail portion Tb of the thumb in other hand) of the printing fingers U1.

That is to way, as shown in FIG. 2 and FIG. 8, on both side plates of the upper machine casing 11*b*, two guide rods 41 are bridged in parallel to each other in a right-and-left direction. On the guide rods 41, a main carriage 42 is installed freely slidably along the guide rods 41. Here, the right-and-left direction where the guide rod 41 is bridged is a direction along the width direction of the grip portion 20*c*. As shown in FIG. 9, on a front wall 42*a* and rear wall 42*b* of the main carriage 42, two guide rods 44 are bridged in parallel to each other along a direction perpendicular to the guide rods 41. On the guide rods 44, a sub-carriage 45 is installed freely slidably along the guide rods 44 concerned. A plurality of printing heads 46 are mounted on a center portion of a lower surface of this sub-carriage 45.

In this embodiment, besides color ink printing heads 46*a* which print color inks containing colorants corresponding to yellow (Y), magenta (M) and cyan (C), an underlying ink printing head 46*b* that prints underlying ink is mounted on the sub-carriage 45.

The underlying ink is ink to be printed on the nail portions T for the purpose of enhancing color emerging of the color inks to be printed on the nail portions T, and so on, and for example, is white ink containing white colorant, and the like. Note that, when the "printing heads 46" are simply mentioned, the printing heads 46 imply both of the printing heads 46*a* for the color inks and the printing head 46*b* for the underlying ink.

Note that a type and number of the printing heads 46 to be mounted on the sub-carriage 45 are not particularly limited. A printing head 46 may be provided, which corresponds to ink containing, for example, colorant corresponding to black (K) as well as the colors mentioned here.

In this embodiment, for example, the respective printing heads 46 are ink jet-type printing heads which, while moving in a predetermined direction, intermittently eject ink droplets, the ink droplets being obtained by converting the ink into fine droplets, allow the ink droplets to reach a print target surface, and perform the printing therefor. The printing heads 46 allow the ejected ink droplets to reach the print target surface, and form a plurality of ink-dots, each of which is made of one or a plurality of the ink droplets, on the print target surface. In such a way, on the print target surface, the printing heads 46 form a ink-dot pattern in which a plurality of ink-dots having ink with a predetermined unit application amount are arrayed. Here, a moving distance in the predetermined direction of each of the printing heads 46 between a position of the printing head 46 when the printing head 46 forms one ink-dot on the print target surface and a position of the printing head 46 when the printing heads 46 next forms one ink-dot on the print target surface is a printing pitch.

Here, image data corresponding to the images to be printed on the nail portions T is composed of a plurality of pixel data px corresponding to respective pixels of the image. The printing heads eject one or the plurality of ink droplets in response to each of the pixel data px, form the ink-dots, and perform the printing.

Note that a recording method of the printing heads 46 is not limited to an ink jet method.

The main carriage 42 is coupled to a motor 43 through a power transmission unit (not shown), and is configured so as to move in a right-and-left direction along the guide rods 41 by forward and reverse rotations of the motor 43.

The sub-carriage 45 is coupled to a motor 47 through a power transmission unit (not shown), and is configured so as to move in a fore-and-aft direction along the guide rods 44 by forward and reverse rotations of the motor 47.

In this embodiment, a movable range of the printing heads 46 is a printing-enabled range by the nail printing device 1, and the printing for the printing fingers U1 is performed within this printing-enabled range.

In the lower machine casing 11*a*, ink cartridges 48 for supplying the inks to the printing heads 46 are provided. The ink cartridges 48 are provided so as to correspond to the above-described respective inks, and are connected to the respective printing heads 46 through ink supply pipes (not shown), and appropriately supply the inks to the respective printing heads 46.

The printing unit 40 is composed by including the guide rods 41, the main carriage 42, the motor 43, the guide rods 44, the sub-carriage 45, the printing heads 46, the motor 47, the ink cartridges 48, and the like.

The motor 43, printing heads 46 and motor 47 of this printing unit 40 are connected to the control unit 51 of the control device 50 to be described later, and are controlled by the control unit 51 concerned.

The operation unit 12 is an input unit for allowing the user to perform a variety of inputs.

In this embodiment, in the operation unit 12, for example, there are arranged: a power supply switch button 121*a* that turns on a power supply of the nail printing device 1; a nail printing start instruction switch button 121*b*; a printing medium printing start instruction switch button 121*c*; a design selection switch button 121*d*; and an operation button 121 for receiving other various inputs.

The nail printing start instruction switch button 121*b* is a button that receives an instruction to start the printing for the nail portions T of the printing fingers U1. When the nail printing start instruction switch button 121*b* is operated, then the nail printing mode is selected, a printing control unit to be described later controls the printing unit 40, and printing processing is performed, which is according to such a nail printing mode of printing, on the nail portions T of the printing fingers U1 inserted into the printing finger insertion portion 20*a*, a positionally aligned image Gg (including the various nail designs D) created by a positionally aligned image creation unit 512.

The printing medium printing start instruction switch button 121*c* is a button that receives an instruction to start the printing for the trial printing sheet. When the printing medium printing start instruction switch button 121*c* is operated, then the printing medium printing mode is selected, the printing control unit controls the printing unit 40, and printing processing is performed, which is according to such a printing medium printing mode of printing a fingernail-superimposed image Gug, the fingernail-superimposed image Gug being created by a fingernail-superimposed image creation unit 513 to be described later, on the printed surface of the trial printing sheet 8 held on the trial printing sheet holding member 6 inserted into the printing finger insertion portion 20*a*. In the printing medium printing mode, besides the fingernail-superimposed image Gug, additional information such as a printing date/time, various comments and a design number is printed in a lump.

In this embodiment, which printing mode between the nail printing mode and the printing medium printing mode the printing is to be performed in is selected depending on whether the nail printing start instruction switch button 121*b* is operated or the printing medium printing start instruction switch button 121*c* is operated. Each of the nail printing start instruction switch button 121*b* and the printing medium printing start instruction switch button 121*c* functions as a printing mode selection unit capable of selecting and setting either one of the printing modes.

The design selection switch button 121*d* is a button that selects the nail design D to be printed. For example, the design selection switch button 121*d* is composed of: a selection portion that shows upper, lower, right and left directions; and a decision portion located at a center thereof. In a state where a nail design designation screen (not shown) is displayed on the display unit 13 to be described later, the user selects a desired nail design D by the selection portion, then operates the decision portion, and can thereby designate the nail design D thus selected. Note that the selection of the nail design D is not limited to the above-described one performed by the design selection switch button 121*d*. For example, keys which receive numbers and the like are provided on the operation unit 12, and such a design number (displayed as "No.

00087" and the like in FIG. 21 to FIG. 24) is inputted, whereby the nail design D may be selected.

The display unit 13 is a display unit composed, for example, of a liquid crystal display (LCD) panel and the like.

Note that, on a surface of the display unit 13, a touch panel may be composed integrally therewith. In this case, the display unit 13 is configured so as to be capable of receiving a variety of inputs by a touch of the surface of the display unit 13 concerned, which is performed by a touching operation using a stylus pen, a fingertip and the like, any of which is not shown. In the case of making the configuration so that which printing mode between the nail printing mode and the printing medium printing mode the printing is to be performed in can be selected by the touch panel, the touch panel of the display unit 13 also functions as such a printing mode selection unit.

On the display unit 13, for example, there are displayed: (1) the fingernail image acquired by taking a photograph of the printing fingers U1 and a nail region image showing the nail portions T thereamong; (2) the nail designs D to be printed on the nail portions T of the printing fingers U1; (3) the positionally aligned image created by positionally aligning the nail designs, which are to be printed on the nail portions T, with the nail regions; (4) the fingernail-superimposed image created by superimposing the positionally aligned image on such a portion of the nail regions of the fingernail image; (5) a thumbnail image for confirming the design and the like; (6) a variety of designation screens; and the like.

For example, the control device 50 is installed on the board 31 arranged in the upper machine casing 11*b*, and the like.

Figure 10:
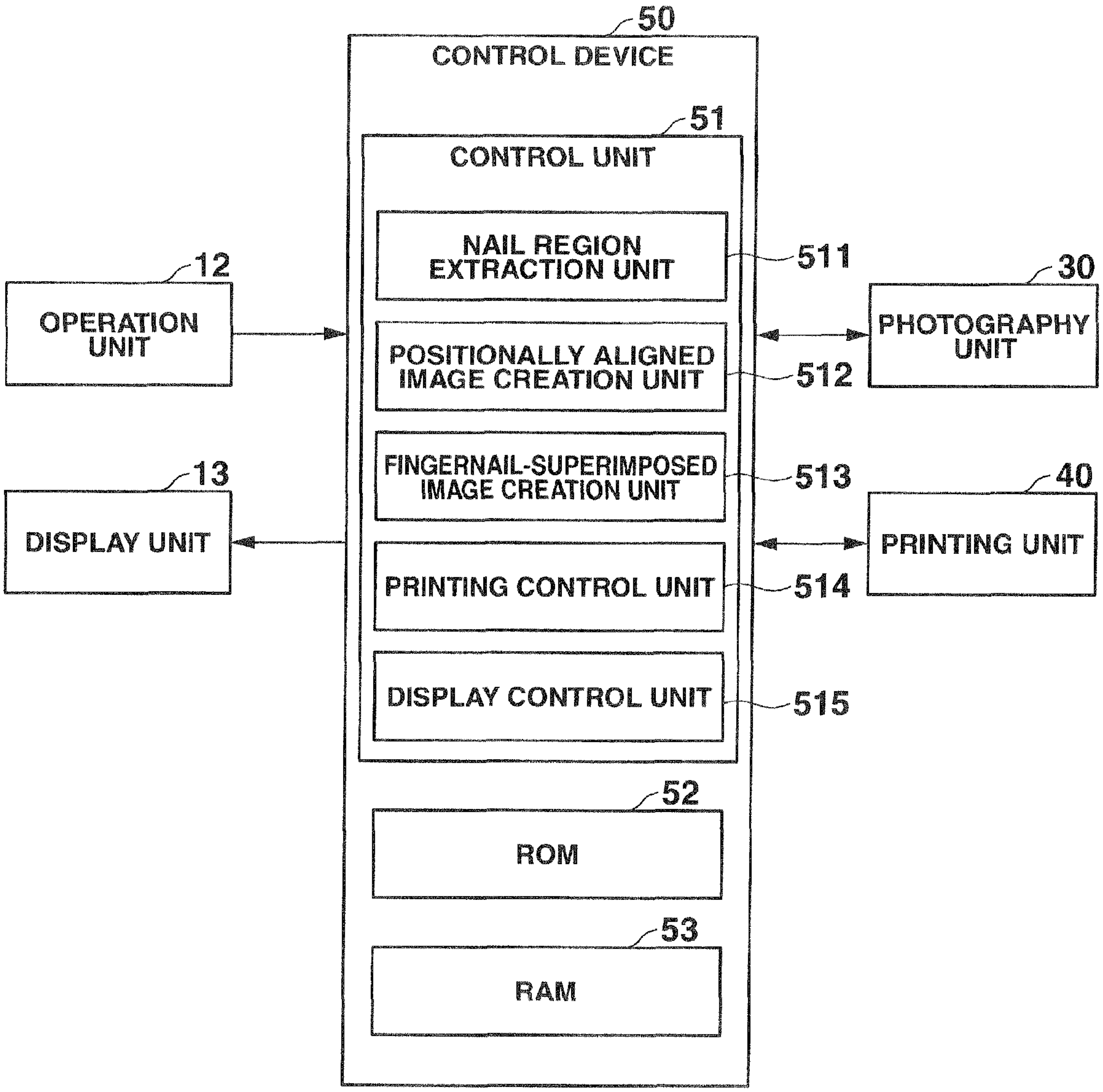
FIG. 10 is a main portion block diagram showing a configuration of a control device in the nail printing device according to this embodiment.

FIG. 10 is a main portion block diagram showing a configuration of the control device in the nail printing device 1 according to this embodiment.

As shown in FIG. 10, the control device 50 is a computer including: the control unit 51 composed of a central processing unit (CPU, not shown) and the like; a read only memory (ROM) 52 as a storage unit; a random access memory (RAM) 53 as a storage unit; and the like.

Note that the storage units are not limited to the ROM 52 and the RAM 53 in the control device 50, and other storage units may be provided.

From a functional viewpoint, this control unit 51 includes a nail region extraction unit 511, a positionally aligned image creation unit 512, a fingernail-superimposed image creation unit 513, a printing control unit 514, a display control unit 515, and the like.

Functions as the nail region extraction unit 511, the positionally aligned image creation unit 512, the fingernail-superimposed image creation unit 513, the printing control unit 514, the display control unit 515, and the like are realized by cooperation between the CPU and a program stored in the ROM 52.

Figure 11:
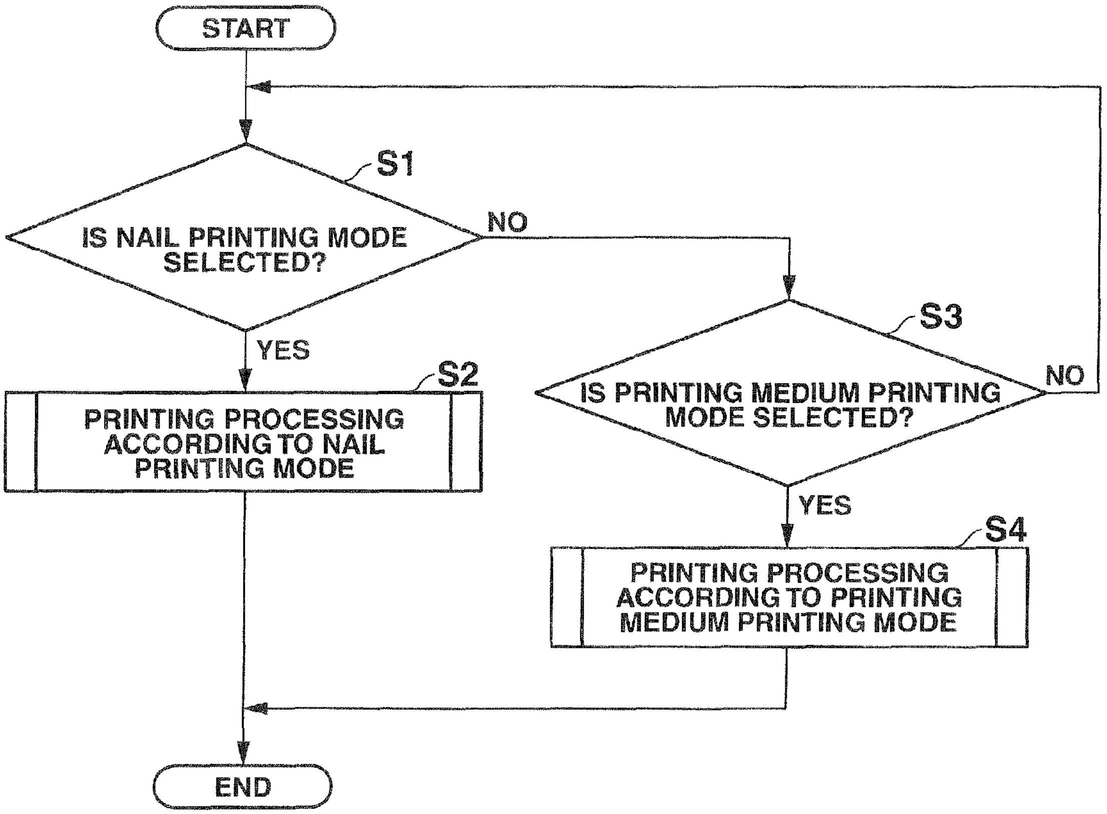
FIG. 11 is a flowchart showing an entire flow of printing control processing in this embodiment.
Figure 12:
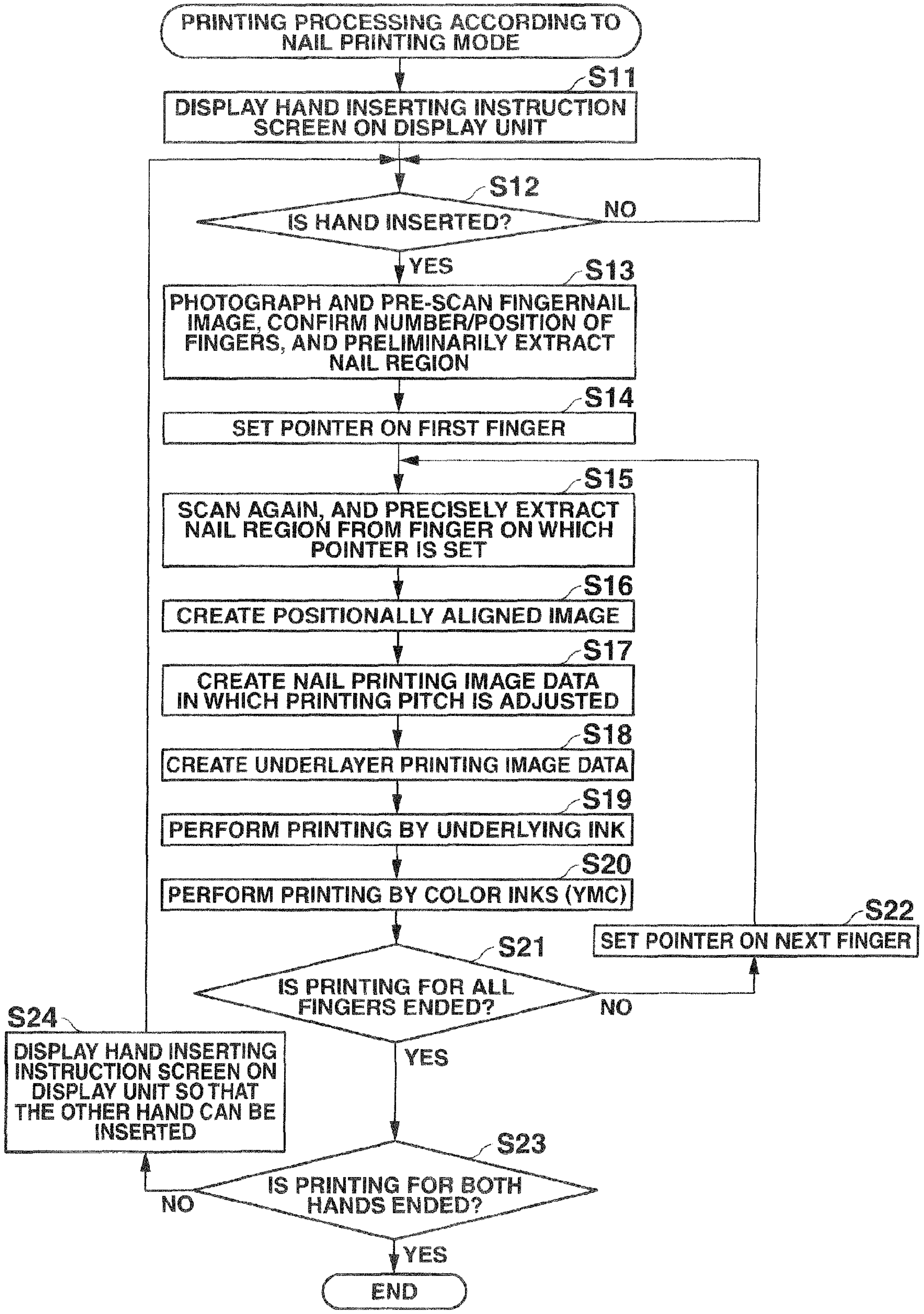
FIG. 12 is a flowchart showing printing processing according to a nail printing mode in this embodiment.
Figure 13:
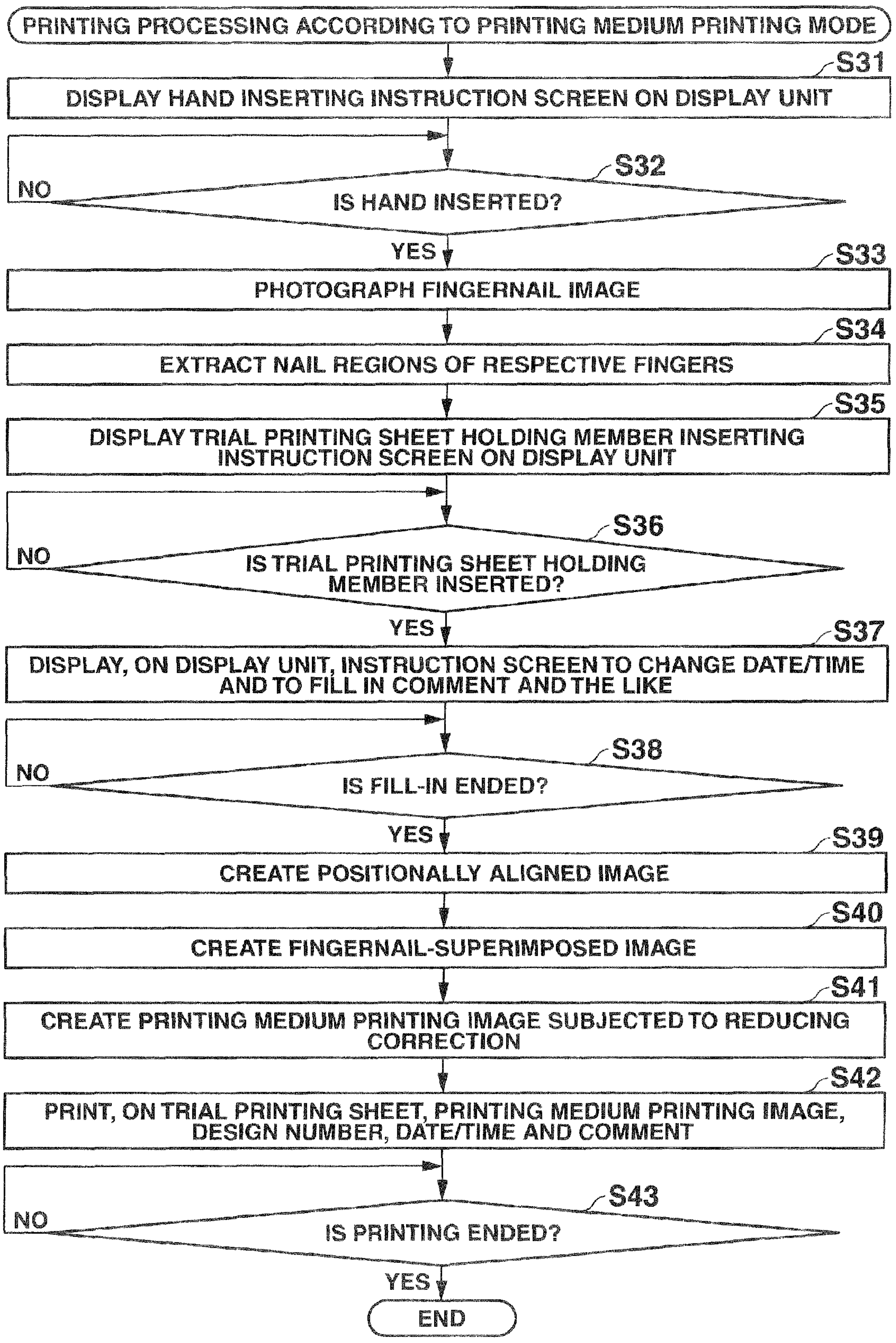
FIG. 13 is a flowchart showing printing processing according to a printing medium printing mode in this embodiment.

FIG. 11 is a flowchart showing an entire flow of printing control processing in this embodiment. FIG. 12 is a flowchart showing printing processing according to the nail printing mode in this embodiment. FIG. 13 is a flowchart showing printing processing according to the printing medium printing mode in this embodiment.

Figure 14:
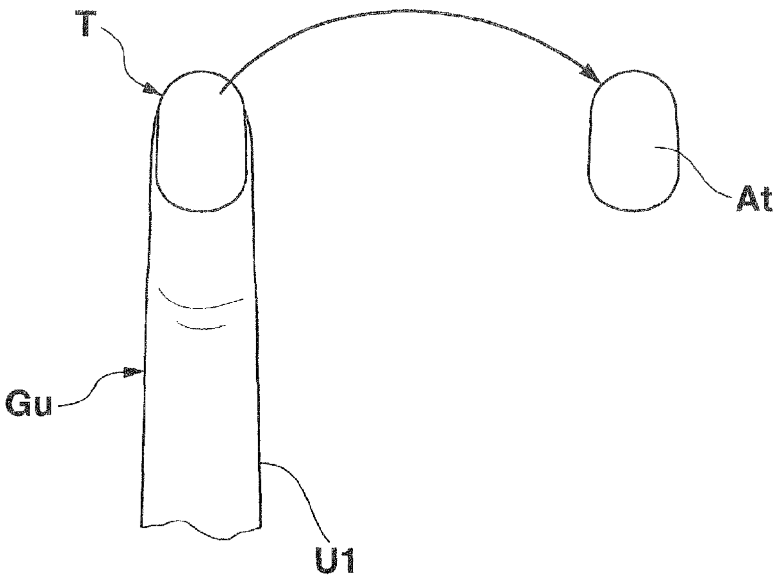
FIG. 14 is an explanatory view for explaining extraction of a nail region in this embodiment.
Figure 15:
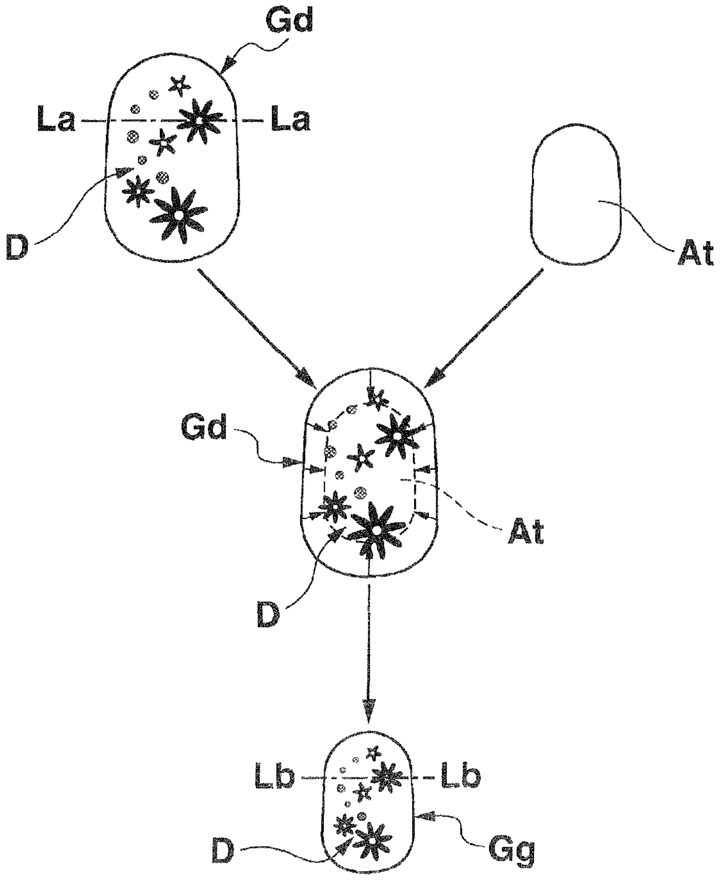
FIG. 15 is an explanatory view for explaining creation of a positionally aligned image in this embodiment.
Figure 16:
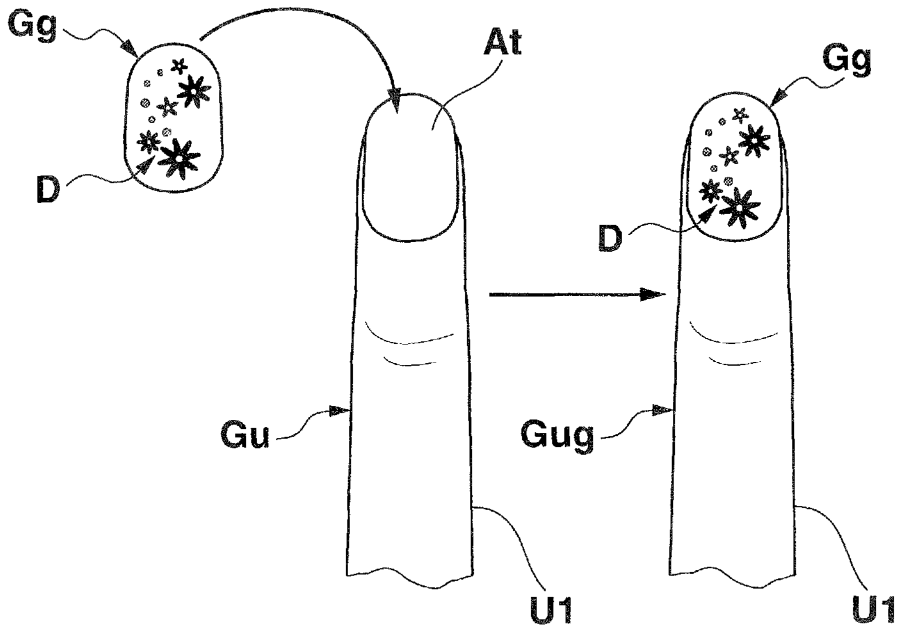
FIG. 16 is an explanatory view for explaining creation of a fingernail-superimposed image in this embodiment.

FIG. 14 is an explanatory view for explaining extraction of the nail region in this embodiment. FIG. 15 is an explanatory view for explaining creation of the positionally aligned image in this embodiment. FIG. 16 is an explanatory view for explaining creation of the fingernail-superimposed image in this embodiment.

Figure 17:
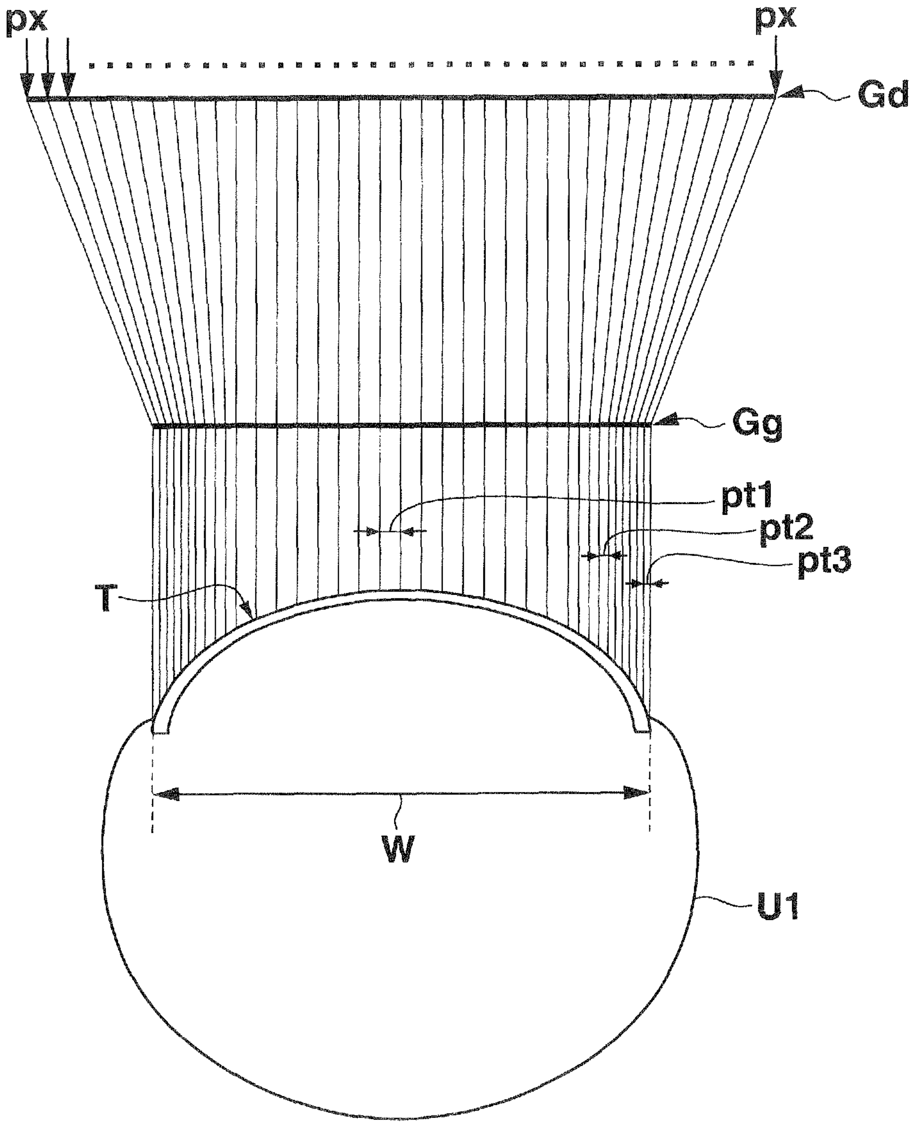
FIG. 17 is an explanatory view for explaining a printing pitch of a nail printing image data in this embodiment.
Figure 18:
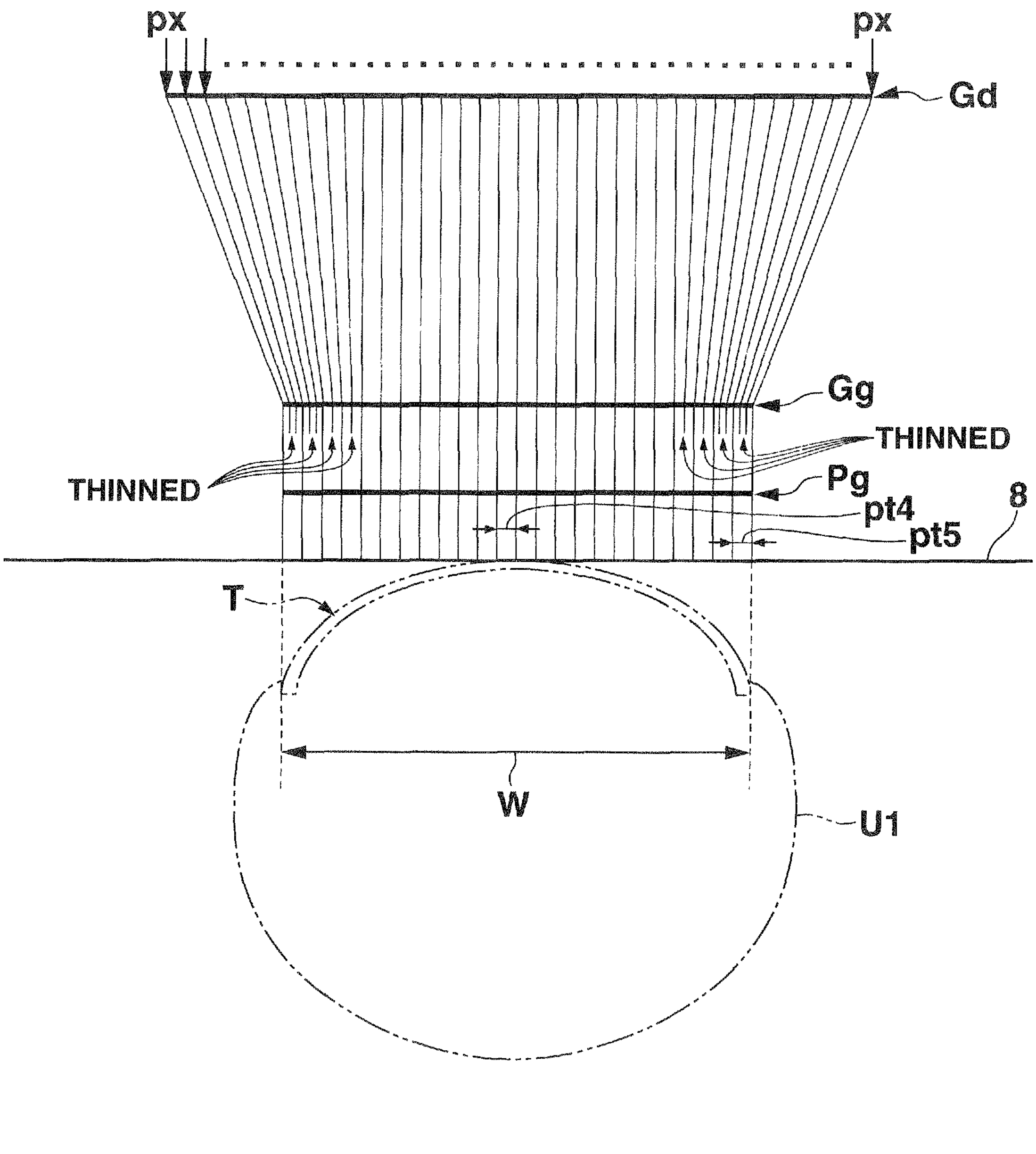
FIG. 18 is an explanatory view for explaining a thinning correction of a printing medium-printed image in this embodiment.

FIG. 17 is an explanatory view for explaining a printing pitch of a nail printing image data in this embodiment. FIG. 18 is an explanatory view for explaining a thinning correction of a printing medium-printed image in this embodiment.

Figure 19A:
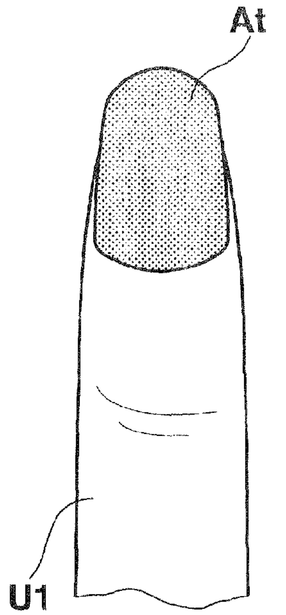
FIGS. 19A, 19B and 19C are views showing away of printing in a case where the printing is implemented for an entire surface of the nail region, where
Figure 19B:
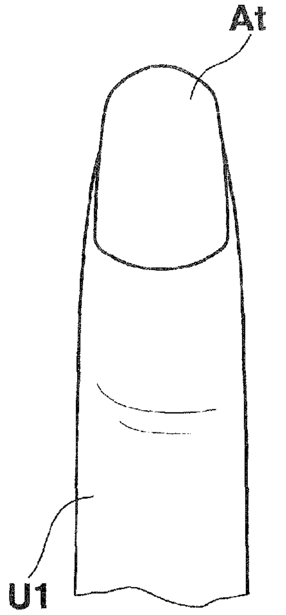
Figure 19C:
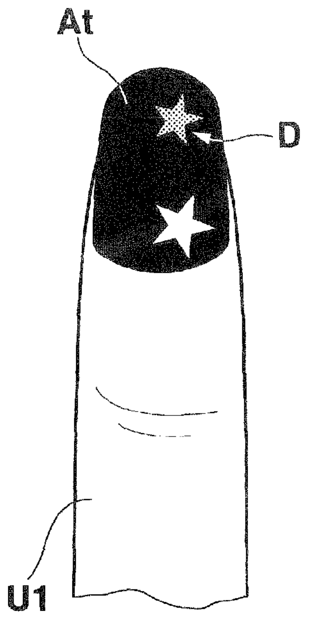

FIGS. 19A, 19B and 19C are views showing a way of printing in a case where the printing is implemented for an entire surface of the nail region: FIG. 19A is a schematic view showing the printing finger before the printing; FIG. 19B is a schematic view showing the printing finger in a state where the underlying ink is printed thereon; and FIG. 19C is a schematic view showing the printing finger in a state where the color ink is printed thereon.

Figure 20A:
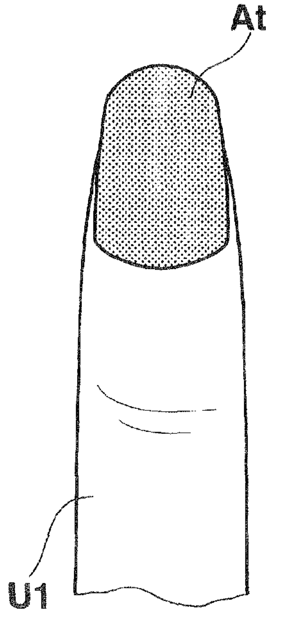
FIGS. 20A, 20B and 20C are views showing a way of printing in a case where the printing is implemented partially for the nail region, where
Figure 20B:
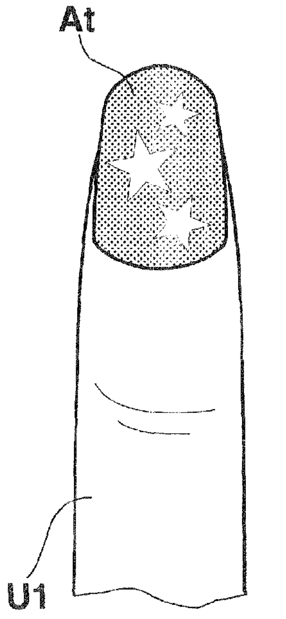
Figure 20C:
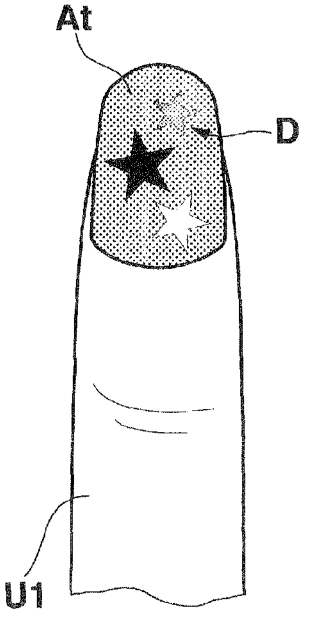

FIGS. 20A, 20B and 20C are views showing a way of printing in a case where the printing is implemented partially for the nail region: FIG. 20A is a schematic view showing the printing finger before the printing; FIG. 20B is a schematic view showing the printing finger in a state where the underlying ink is printed thereon; and FIG. 20C is a schematic view showing the printing finger in a state where the color ink is printed thereon.

The nail region image extraction unit 511 composes a nail region extraction unit, and as shown in FIG. 14, extracts, from the fingernail image Gu of the printing finger U1, which is acquired by the photography unit 30 as the fingernail image acquisition unit, the nail region At corresponding to the nail portion T contained therein.

For example, the nail region extraction unit 511 extracts the nail region image (outline of the nail portion T) from the fingernail image Gu, which is acquired by the photography unit 30, based on a color difference between the nail portion T and other finger portion, and the like. Note that a method for extracting the nail region At by the nail region image extraction unit 511 is not particularly limited, and is not limited to that mentioned here.

The positionally aligned image creation unit 512 composes a positionally aligned image creation unit, and as shown in FIG. 15, positionally aligns the nail design D, which is to be printed on the nail portion T, with the nail region extracted by the nail region extraction unit 511, thereby creating the positionally aligned image Gg, which goes along a shape of the nail region At, from an original image (nail design original image Gd) of the nail design D.

Here, the nail design original image Gd is a two-dimensional image, and is composed of a plurality of pixels arrayed two-dimensionally.

The positionally aligned image Gg is an image created in such a manner that a size and shape of the nail design original image Gd are adjusted so as to be matched with a size and shape of the nail region At of the user, and that the pixel data px corresponding to the respective pixels of the nail design original image Gd are assigned thereto.

FIG. 17 schematically shows a concept among an array of the pixel data px at a spot going along a line La-La extended in a width direction, which is shown in FIG. 15, in the nail design original image Gd, an array of the pixel data px at a spot going along a line Lb-Lb extended in the width direction, which corresponds to the line La-La, in the positionally aligned image Gg, and printing pitches pt1, pt2 and pt3. Here, the concept is shown so as to correspond to a curve-shape of the surface of the nail portion T.

As shown in FIG. 17, a dimension in the width direction of the positionally aligned image Gg is substantially the same as an apparent dimension W in the width direction of the nail portion T when viewed from the above.

Note that the surface (print target surface) of the human nail portion T forms a curve-shape in which a distance from the printing unit 40 becomes larger as going toward an end portion thereof in the width direction.

As shown in FIG. 17, the positionally aligned image creation unit 512 changes the number of pieces of the pixel data px corresponding to the respective pixels of the nail design original image Gd, which is to be assigned to the positionally aligned image Gg, in response to the region of the positionally aligned image Gg, and creates the positionally aligned image Gg. That is to say, the positionally aligned image creation unit 512 increases the number of pieces of the pixel data px to be assigned to regions equivalent to both end sides in the width direction of the nail portion T of the positionally aligned image Gg than the number of pieces of the pixel data px to be assigned to a center portion in the width direction concerned, and then creates the positionally aligned image Gg. The printing pitches are set in response to the number of such assigned pixel data px. The printing pitch on the center portion in the width direction is set at pt1, the printing pitch is set at pt2 and pt3 on each of end portion sides in the width direction, and a relation among the printing pitches pt1, pt2 and pt3 is established as: pt1>pt2>pt3.

In such a way, in the event where the nail design is printed on the surface of the nail portion T having the curve-shape in the width direction, a distortion can be prevented from occurring in the nail design D on the end portions of the nail portion T, and a color density can be prevented from being reduced therein.

The fingernail-superimposed image creation unit 513 composes a fingernail-superimposed image creation unit, and as shown in FIG. 16, superimposes the positionally aligned image, which is created by the positionally aligned image creation unit 512, on the portion of the nail region At in the fingernail image Gu of the printing finger U1, which is acquired by the photography unit 30, and then creates the fingernail-superimposed image Gug including the image of the whole of the printing finger U1.

The fingernail-superimposed image Gug is an image in which the nail design D is superimposed on the portion of the nail region At in the image of the whole of the printing finger U1 including the nail portion T, and is an image showing a state where the printing finger U1 of the case where the printing is actually performed for the nail portion T is viewed from the above, that is, from an upper direction (back-of-hand side).

The printing control unit 514 composes a printing control unit, and controls the printing unit 40 to perform the printing while switching a printing aspect in response to the printing mode selected in such a manner that either one of the nail printing start instruction switch button 121*b* and the printing medium printing start instruction switch button 121*c* in the operation unit 12 as the printing mode selection unit is operated.

When the nail printing start instruction switch button 121*b* is operated and the nail printing mode is selected, the printing control unit 514 controls the printing aspect of the printing unit 40 so that, in response to the positionally aligned image Gg, the printing pitch pt in the event of the printing by the printing unit 40 can be finer in the regions equivalent to both end sides in the width direction of the nail portion T than in the region equivalent to the center portion in the width direction thereof.

That is to say, as shown in FIG. 17, in the positionally aligned image Gg, a larger number of the pixel data px are assigned to the regions equivalent to both end sides in the width direction of the nail portion T than to the region equivalent to the center portion in the width direction thereof.

The printing control unit 514 creates nail printing image data that sets values of the printing pitch pt so that the printing pitches pt2 and pt3 on both end sides in the width direction in the positionally aligned image Gg can be finer than the printing pitch pt1 on the center portion in the width direction concerned in response to the number of pieces of the pixel data px to be assigned to both end sides. Then, the printing control unit 514 outputs this nail printing image data to the printing unit 40, thereby allowing the printing unit 40 to perform the printing for the nail portion T.

Note that it is not essential for the present invention that the printing control unit 514 creates the nail printing image data. For example, the nail printing image data is not created separately, but the image data of the positionally aligned image Gg may be outputted to the printing unit 40 while being appropriately converted by a lookup table (LUT) and the like, and the values of the printing pitch pt may be controlled as appropriate.

To which extent the printing pitch pt on both end sides should be made fine, and the like are not particularly limited. However, for example, in the case where the printing pitch pt1 on the center portion in the width direction is 600 dpi, then the printing pitch pt3 on such right and left utmost end portions is set at 2400 dpi, and the printing pitch pt2 on such right and left intermediate portions is set at 1200 dpi.

Note that the values of the printing pitch may be changed at a plurality of stages so that the printing pitch can be made gradually finer as going toward the end portions in response to a curvature of the surface of the nail portion T.

The printing pitch is set in response to resolution of the printing unit 40, and for example, in the case where an upper limit of the printing pitch at which the printing unit 40 is capable of the printing is 1800 dpi, the printing pitch on the right and left utmost end portions is set at 1800 dpi.

As described above, the printing pitch for the regions equivalent to both end sides of the nail portion T is made fine, whereby, even in the case where the printing is implemented for the nail portion T in which both end sides are curved in the direction of going away from the printing unit 40, a high-definition image can be printed, in which the distortion does not occur in the nail design D to end portions thereof, and the density is not lowered therein, either.

When the nail printing mode is selected, the printing control unit 514 controls the printing aspect of the printing unit 40 so that the portion to be subjected to the printing can be first subjected to the printing by the underlying ink by using the printing head 46*b* for the underlying ink.

That is to say, the surface of the nail portion T is transparent, and accordingly, in the case of printing a flower pattern and the like by using the color inks, the colors of the inks do not emerge sufficiently if the flower pattern and the like are directly printed on the nail portion T by the color inks, and the printing is not finished as the impression. Therefore, it is preferable that the printing by the underlying ink be first performed before the printing by the color inks is performed. Accordingly, in this embodiment, the printing control unit 514 creates an underlayer printing image data by extracting a portion, which is to be subjected to the printing by the underlying ink, from the positionally aligned image Gg including the nail design D to be printed. Then, the printing control unit 514 outputs this underlayer printing image data to the printing unit 40, thereby allowing the printing unit 40 to perform the printing for the nail portion T by the underlying ink.

For example, as shown in FIG. 19C, the case is considered, where the selected nail design D is a design in which a color such as pink is applied on the whole of the nail portion T and star patterns of yellow, light blue and white colors are drawn thereon. Then, in a state where the underlying ink is not applied, the nail portion T is transparent (refer to FIG. 19A), and accordingly, the underlying ink (for example, white ink)

is first printed on the whole of the nail portion T (refer to FIG. 19B). Then, thereafter, a pink color is printed by color ink for the whole of the nail portion T, and the patterns ("stars" in FIG. 19C) are further printed thereon individually by the color inks.

Note that, in the case where the underlying ink is white, the white pattern ("star in FIG. 19C) portion, which is the same in color as the underlying ink, is not subjected to such pink-color printing, but is left outlined as it is. In such a way, the white pattern portion is not further subjected to overlap printing by the white ink after being subjected to the pink-color printing, and the white color of the underlying ink directly becomes the color of the pattern.

As shown in FIG. 20C, the case is considered, where the selected nail design D is a design in which a color intrinsic to the nail portion T is utilized and the star patterns of the yellow, light blue and white colors are partially drawn on the nail portion T. Then, the printing by the underlying ink is performed for the three star pattern portions. Thereafter, the star pattern portions of the yellow and light blue colors are further subjected to the overlap printing individually by the color inks. In such a way, with regard to the yellow and light blue stars, the color inks are allowed to overlap the underlying ink, whereby the respective colors emerge vibrantly, and with regard to the white pattern portion, the white ink is not printed thereon in an overlapping manner, and the white color of the underlying ink directly becomes the color of the pattern.

Note that is it not essential for the present invention that the printing control unit 514 creates the underlayer printing image. For example, the printing control unit 514 may perform the printing control in the following manner. The underlying printing image data is not created separately, but a portion to be subjected to the printing by any ink is extracted from the image data of the positionally aligned image Gg including the nail design D, position data and the like of the extracted portion are outputted to the printing unit 40, and the printing unit 40 is allowed to perform the printing by the underlying ink.

Meanwhile, when the printing medium printing mode is selected, then among the fingernail-superimposed image Gug created by the fingernail-superimposed image creation unit 513, in the regions equivalent to both end sides in the width direction of the nail portion T in the positionally aligned image Gg, the printing control unit 514 controls the printing aspect of the printing unit 40 so as to thin out a part of the pixel data px assigned to the positionally aligned image Gg, and to perform the printing at a substantially equal printing pitch.

FIG. 18 schematically shows a concept among the array of the pixel data px at the spot going along the line La-La extended in the width direction, which is shown in FIG. 15, in the nail design original image Gd, the array of the pixel data px at the spot going along the line Lb-Lb extended in the width direction, which corresponds to the line La-La, in the positionally aligned image Gg, an array of the pixel data px at a spot going along the line Lb-Lb in a printing medium printing image Pg, and printing pitches pt4 and pt5. Here, the concept is shown so as to correspond to the curve-shape of the surface of the nail portion T.

As shown in FIG. 18, in the positionally aligned image Gg superimposed on the nail region, the number of pieces of the pixel data px to be assigned to the regions equivalent to both end sides in the width direction of the nail portion T is larger than the number of pieces of the pixel data px to be assigned to the region equivalent to the center portion in the width direction concerned in matching with the curve-shape of the nail portion T.

Meanwhile, unlike in the nail portion T, in the trial printing sheet 8, the surface (print target surface) thereof is not curved but flat. Therefore, if the above-described positionally aligned image Gg is directly printed on the trial printing sheet 8, then the pixels are loaded too much in the regions equivalent to both end sides in the width direction of the nail portion T, the ink droplets overlap one another in the event of to printing, and the color is thickened.

Accordingly, as shown in FIG. 18, in the regions equivalent to both end sides in the width direction of the nail portion T in the image data of the positionally aligned image Gg, the printing control unit 514 performs a thinning correction which thin out a part of the pixel data px assigned to the region concerned, and creates the printing medium printing image Pg.

Then, the printing control unit 514 outputs, to the printing unit 40, printing medium printing image data corresponding to the printing medium printing image Pg, thereby sets the printing pitch pt4 on the center in the width direction and the printing pitch p5 on the end portions in the width direction at substantially the same value, and allows the printing unit 40 to perform the printing for the trial printing sheet 8 at a substantially equal printing pitch.

Note that it is not essential for the present invention that the printing control unit 514 creates the printing medium printing image Pg. For example, the printing medium printing image Pg is not created, but the image data of the positionally aligned image Gg may be outputted to the printing unit 40 while being appropriately converted by the lookup table (LUT) and the like, and control similar to the above-described thinning of the pixel data px may be performed as appropriate.

To which extent the pixels should be thinned in the regions equivalent to both end sides, and the like are not particularly limited. For example, the pixels are not thinned on the center portion in the width direction, approximately two thirds or three fourths of the pixels are thinned on the right and left utmost end portions, and approximately a half of the pixels are thinned on the intermediate portions therebetween. Note that, preferably, the thinning correction is adjusted so that a printing density and the like can be equalized, that is, so that the printing pitch can be substantially equalized between the center portion and both end sides in the width direction of the nail portion T. A thinning ratio may be changed at a plurality of stages so that a thinning amount can be gradually increased as going toward the end portions in the regions equivalent to both end sides of the nail portion T.

As described above, the pixels are appropriately thinned in the regions equivalent to both end sides of the nail portion T in the positionally aligned image Gg, whereby the density on both end sides does not become extremely thick, and on the trial printing sheet 8, an image can be printed, which is substantially similar to an image in which the nail portion T having the nail design D actually printed thereon is viewed from the above.

When the printing medium printing mode is selected, the printing control unit 514 controls the printing aspect of the printing unit 40 so that the printing can be performed by only using the printing heads 46*a* for the color inks.

That is to say, in the case where the printing is performed for the trial printing sheet 8, an underlayer (or a base) thereof is white, and accordingly, even if the printing by the color inks is directly performed without using the underlying ink, an original color can be allowed to emerge. Then, the white pattern portion can be expressed by being outlined without printing anything thereon. Therefore, in the printing medium printing mode, by using the printing heads 46*a* for the color inks, the printing is performed for only the portions to be printed by using the colors other than white, and with regard to the white portion, a base color of the trial printing sheet 8 is left as it is.

The display control unit 515 is a display control unit that allows a display unit 26 as a display unit to display various displays. In this embodiment, the display control unit 515 allows the display unit 26 to display, for example, a selection screen for the nail design D, a fingernail image acquired by photographing the printing finger U1, an image of the nail region, which shows the nail portion T therein, a variety of instruction screens such as a hand inserting instruction screen and a trial printing sheet holding member inserting instruction screen, and the like.

In this embodiment, as mentioned above, the printing finger U1 and the trial printing sheet holding member 6, which are inserted into the printing finger insertion portion 20*a*, are photographed by the camera 32 of the photography unit 30, and the images thus photographed are sent to the control unit.

The control unit 51 analyzes each of the images picked up by the photography unit 30, thereby determining whether or not the printing finger U1 or the trial printing sheet holding member 6 is inserted into the printing finger insertion portion 20*a*.

In the ROM 52 as the storage unit, there are stored a variety of programs such as: a nail region extraction program for extracting the nail region At from the fingernail image; a positionally aligned image creation program for creating the positionally aligned image; a fingernail-superimposed image creation program for creating the fingernail-superimposed image; and a printing control processing program for performing the printing control processing program. By the control device 50, these programs are executed as appropriate, whereby the respective units of the nail printing device 1 are controlled in a centralized manner.

In the ROM 52, data of the original images Gd of the nail designs D are stored. Note that the number of pieces and the like of the data of the original images Gd of the nail designs D are not particularly limited. The data of the original images Gd of the nail designs D are not limited to those stored in the ROM 52, and a configuration may be adopted so that, from an external storage unit such as a memory card, a USB memory and various hard disks, the data of the original images Gd of the nail designs D can be captured into the nail printing device 1, and the printing can be thereby performed.

In this embodiment, the RAM 53 as the storage unit includes: a storage area that stores a variety of data, and the like; and a work area (not shown) that expands the programs and the like in the event where the control unit 51 performs a variety of processing.

In this embodiment, in the storage area, there are stored a variety of data such as: the fingernail image acquired by the photography unit 30; data of the nail region extracted from the fingernail image; the positionally aligned image Gg created from the data of the original image Gd of the nail design D; the fingernail-superimposed image Gug created by superimposing the positionally aligned image Gg on the fingernail image; a pre-scan result in the nail printing mode; and data of the comment inputted by the user in the printing medium printing mode.

Note that these data may be configured so as to be stored in the storage unit such as the ROM 52 in association with one another, and to be readable and usable in the event of the printing at the next time and after.

Next, a description is made of a printing control method by the above-described nail printing device 1 based on flowcharts of FIG. 11 to FIG. 13 and on FIG. 14 to FIG. 24.

FIG. 21 is a plan view showing an example of the trial printing sheet in this embodiment.

As shown in FIG. 11, first, the control unit 51 determines whether or not the nail printing mode is selected (Step S1).

Subsequently, in the case where it is determined that the nail printing start instruction switch button 121*b* among the switch buttons of the operation unit 12 as the printing mode selection unit is operated (Step S1: YES), the control unit 51 performs the printing processing according to the nail printing mode (Step S2).

Meanwhile, in the case where it is determined that the nail printing mode is not selected (Step S1: NO), then the control unit 51 further determines whether or not the printing medium printing mode is selected (Step S3).

Then, in the case where the printing medium printing start instruction switch button 121*c* is operated (Step S3: YES), the control unit 51 performs the printing according to the printing medium printing mode (Step S4).

Note that in the case where it is determined that either of the nail printing start instruction switch button 121*b* and the printing medium printing start instruction switch button 121*c* is not operated, and that either of the printing modes is not selected (Step S3: NO), then the determination of Step S1 is repeated.

Printing processing shown in FIG. 12 corresponds to Step S2 of FIG. 11.

Note that, in the nail printing device 1 of this embodiment, the printing is simultaneously implemented for the nail portions T of the plurality of printing fingers U1 of the right and left hands inserted into the printing finger insertion portion 20*a* (that is, the nail portions Ta of the four fingers of one hand, and the nail portion Tb of the thumb of the other hand). Here, "simultaneously printed" stands for that the printing can be continuously performed for the plurality of printing fingers U1 inserted into the printing finger insertion portion 20*a* at a time without taking out the printing fingers U1 therefrom.

As shown in FIG. 12, when the nail printing start instruction switch button 121*b* is operated, and the nail printing mode is thereby selected, then the display control unit 515 allows the display unit 13 to display the hand inserting instruction screen that instructs the insertion of the hands into the printing finger insertion portion 20*a* of the nail printing device 1 (Step S11).

The photography unit 30 repeatedly takes a photograph of the inside of the printing finger insertion portion 20*a* at a predetermined time interval, and sends the acquired images to the control unit 51.

Based on the images sent from the photography unit 30, the control unit 51 determines whether or not the hands (printing fingers U1) of the user are inserted into the printing finger insertion portion 20*a* (Step S12).

In the case where it is determined by the control unit 51 that the hands are not inserted into the printing finger insertion portion 20*a* (Step S12: NO), then the processing of Step S12 is repeated until the hands are inserted thereinto.

On the other hand, in the case where it is determined by the control unit 51 that the hands are inserted into the printing finger insertion portion 20*a* (Step S12: YES), then the control unit 51 controls the photography unit 30 to image the fingernail image including the respective nail regions At of the plurality of printing fingers U1 inserted into the printing finger insertion portion 20*a*. Then, the control unit 51 prescans this fingernail image, thereby acquiring the number and position information of the printing fingers U1 thus inserted, and in addition, preliminarily extracting approximate positions and ranges of the nail regions of the respective printing fingers U1 (Step S13).

When such pre-scan is completed, the control unit 51 sets any one of the printing fingers U1 (for example, the thumb of the right hand located on a right end in FIG. 4A) as a first target. Then, a sight (focus) of the camera 32 is taken at such a specific printing finger U1 corresponding to this target ("set pointer" in FIG. 12, Step S14).

Then, this specific printing finger U1 is acquired, and is scanned one more time (Step S15). Specifically, the nail region extraction unit 511 precisely extracts the nail region At of the nail portion T from the fingernail image Gu of the specific printing finger U1, which is acquired by the photography unit 30 (refer to FIG. 14).

Subsequently, when the nail region At is extracted, then the positionally aligned image creation unit 512 positionally aligns the nail design D, which is selected by the user, with this nail region At, and aligns sizes and the like of both with each other, thereby creating the positionally aligned image Gg (Step S16, refer to FIG. 15).

Moreover, the printing control unit 514 creates the nail printing image data in which, in the positionally aligned image Gg, the printing pitch in the event of the printing by the printing unit 40 is adjusted to be finer in the regions equivalent to both end sides in the width direction of the nail portion T than in the center portion in the width direction concerned (Step S17, refer to FIG. 17).

Furthermore, the printing control unit 514 extracts the data of the portion to be subjected to the printing, and creates the underlayer printing image as the image of the portion on which the underlying ink is to be printed (Step S18).

Then, the printing control unit 514 controls the printing unit 40 to first perform the printing for the portion, which is to be subjected to the printing, by the underlying ink by using the underlying ink printing head 46*b* before performing the printing by the color inks (Step S19, refer to FIG. 19B and FIG. 20B).

Thereafter, the printing control unit 514 controls the printing unit 40 to perform the printing for the portions, which are to be colored by colors other than white, by the color inks of yellow (Y), magenta (M) and cyan (C) by using the color ink printing heads 46*a* (Step S20, refer to FIG. 19C and FIG. 20C).

Subsequently, the control unit 51 determines whether or not the printing is ended for all of the printing fingers U1 (Step S21).

In the case where the control unit 51 determines that the printing fingers U1, for which the printing is not ended, are present (Step S21: NO), then the control unit 51 takes a sight (focus) of the camera 32 (that is, "set pointer" in Step S22) at either of the printing fingers U1 (for example, a finger next to the finger printed first; the forefinger of the left hand in FIG. 4A) for which the printing is not ended. Then, the control unit 51 repeats the processing from Step S15 to Step S21.

On the other hand, in the case where the control unit 51 determines that the printing is ended for all of the printing fingers U1 (Step S21: YES), then the control unit 51 further determines whether or not the printing is ended for all of the fingers of both hands (Step S23).

Then, in the case where the control unit 51 determines that the printing is ended for all of the fingers of both hands (Step S23: YES), then the control unit 51 ends the printing processing.

On the other hand, in the case where the control unit 51 determines that the hand for which the printing is not ended is present (Step S23: NO), then the control unit 51 allows the display unit to display the hand inserting instruction screen so that the hand for which the printing is not ended can be inserted into the printing finger insertion portion 20*a* (Step S24).

Thereafter, the control unit 51 repeats the processing from Step S12 to Step S23 in a similar way.

Note that a processing procedure of the printing processing according to the nail printing mode is not limited to that described here.

For example, an order of the creation (Step S16) of the positionally aligned image Gg, the adjustment (Step S17) of the printing pitch, the creation (Step S18) of the underlying image, and the like may differ from that shown in FIG. 12.

Next, printing processing shown in FIG. 13 corresponds to Step S4 of FIG. 11.

As shown in FIG. 13, when the printing medium printing start instruction switch button 121*c* is operated, and the printing medium printing mode is selected, then the display control unit 515 allows the display unit 13 to display the hand inserting instruction screen that instructs the insertion of the hands into the printing finger insertion portion 20*a* of the nail printing device 1 (Step S31).

The photography unit 30 repeatedly takes a photograph of the inside of the printing finger insertion portion 20*a* at a predetermined time interval, and sends the acquired images to the control unit 51.

Based on the images sent from the photography unit 30, the control unit 51 determines whether or not the hands (printing fingers U1) of the user are inserted into the printing finger insertion portion 20*a* (Step S32).

In the case where it is determined by the control unit 51 that the hands are not inserted into the printing finger insertion portion 20*a* (Step S32: NO), then the processing of Step S32 is repeated until the hands are inserted thereinto.

On the other hand, in the case where it is determined by the control unit 51 that the hands are inserted into the printing finger insertion portion 20*a* (Step S32: YES), then the control unit 51 controls the photography unit 30 to image the plurality of printing fingers U1 inserted into the printing finger insertion portion 20*a*. In such a way, the control unit 51 acquires the fingernail images including the respective nail regions At of the plurality of printing fingers U1 (Step S33).

When the fingernail images are acquired by the photography unit 30, the nail region extraction unit 511 extracts the nail regions At of the nail portions T from the acquired respective fingernail images Gu of the plurality of printing fingers U1 (Step S34, refer to FIG. 14).

On the other hand, the display control unit 515 allows the display unit 13 to display the trial printing sheet holding member inserting instruction screen that instructs the insertion of the trial printing sheet holding member 6 into the printing finger insertion portion 20*a* of the nail printing device 1 (Step S35).

The photography unit 30 repeatedly takes a photograph of the inside of the printing finger insertion portion 20*a* at a predetermined time interval, and sends the acquired images to the control unit 51.

Based on the images sent from the photography unit 30, the control unit 51 determines whether or not the trial printing sheet holding member 6 is inserted into the printing finger insertion portion 20*a* (Step S36).

In the case where it is determined by the control unit 51 that the trial printing sheet holding member 6 is not inserted into the printing finger insertion portion 20*a* (Step S36: NO), then the processing of Step S36 is repeated until the trial printing sheet holding member 6 is inserted thereinto.

On the other hand, in the case where it is determined by the control unit 51 that the trial printing sheet holding member 6 is inserted into the printing finger insertion portion 20*a* (Step S36: YES), then the display control unit 515 allows the display unit 13 to display an instruction screen that instructs input (fill-in) of a change of the date/time, a comment and the like (Step S37).

The control unit 51 determines whether or not the input of such a date/time change, the comment and the like from the operation unit 12 and the like is ended (Step S38).

In the case where it is determined by the control unit 51 that the input is not ended (Step S38: NO), then the determination of Step S38 is repeated until the input is ended.

On the other hand, when it is determined by the control unit 51 that the input is ended (Step S38: YES), then the positionally aligned image creation unit 512 positionally aligns the nail design D, which is selected by the user, with the nail region At, which is extracted by the nail region extraction unit 511, aligns sizes and the like of both with each other, thereby creating the positionally aligned image Gg (Step S39, refer to FIG. 15).

Note that, in the case where the user selects a plurality of the nail designs D, then the positionally aligned image creation unit 512 creates the positionally aligned images Gg for all thereof, and allows the display unit 13 to display the created positionally aligned images Gg on the display screen thereof. Then, only the positionally aligned image Gg selected by the user from among those thus displayed may be subjected to trial printing.

Subsequently, the fingernail-superimposed image creation unit 513 superimposes the positionally aligned image Gg, which is created by the positionally aligned image creation unit 512, on the portion of the nail region At in the fingernail image Gu acquired by the photography unit 30, and then creates the fingernail-superimposed image Gug (Step S40, refer to FIG. 16).

When the fingernail-superimposed image Gug is created, then among the fingernail-superimposed image Gug thus created, in the regions equivalent to both end sides in the width direction of the nail portion T in the image data of the positionally aligned image Gg, the printing control unit 514 performs the correction of thinning the pixel data px, and creates the printing medium printing image Pg (Step S41. refer to FIG. 18).

Then, the printing control unit 514 controls the printing unit 40 to print the date, the design number and the comment, both of which are inputted from the operation unit 12, and the like, on a predetermined area of the trial printing sheet 8 together with the fingernail-superimposed image Gug already subjected to the thinning correction (that is, the printing medium printing image Pg).

At this time, the printing control unit 514 performs the printing by the color inks of yellow (Y), magenta (M) and cyan (C) by using the printing heads 46*a* for the color inks other than white (Step S42).

In such a way, for example as shown in FIG. 21, the fingernail-superimposed image Gug in a state where the same nail design D is implemented individually for five fingers of one hand, the design number of the selected nail design D, the printing date/time, and the comment are printed on the nail design printing area 81, the date/time and like printing area 81*a*, the comment printing area 81*b* and the like (refer to FIG. 5) in the trial printing sheet 8.

Note that a processing procedure of the printing processing according to the printing medium printing mode is not limited to that described here. For example, an order of the fill-in (Step S37) of the comment and the like, the creation (Step S39) of the positionally aligned image Gg, the creation (Step S40) of the fingernail-superimposed image Gug, the thinning correction processing (Step S41), and the like may differ from that shown in FIG. 13.

The printing control unit 514 determines whether or not the printing is ended (Step S43). In the case where the printing control unit 514 determines that the printing is not ended (Step S43: NO), then the determination of Step S43 is repeated until the printing is ended.

After the end of the printing, the user can fill a memorandum in the handwritten memorandum area 82 by the pen and the like. For example, an impression of clothes scheduled to be matched with the printed nail design D, an impression of the nail design D concerned, an opining from a friend, and the like are written by hand on the handwritten memorandum area 82, and can thereby being taken as references in the event where the trial printing sheet 8 is seen later on.

Note that contents to be printed on the trial printing sheet 8 are not limited to those shown in FIG. 21.

Figure 22:
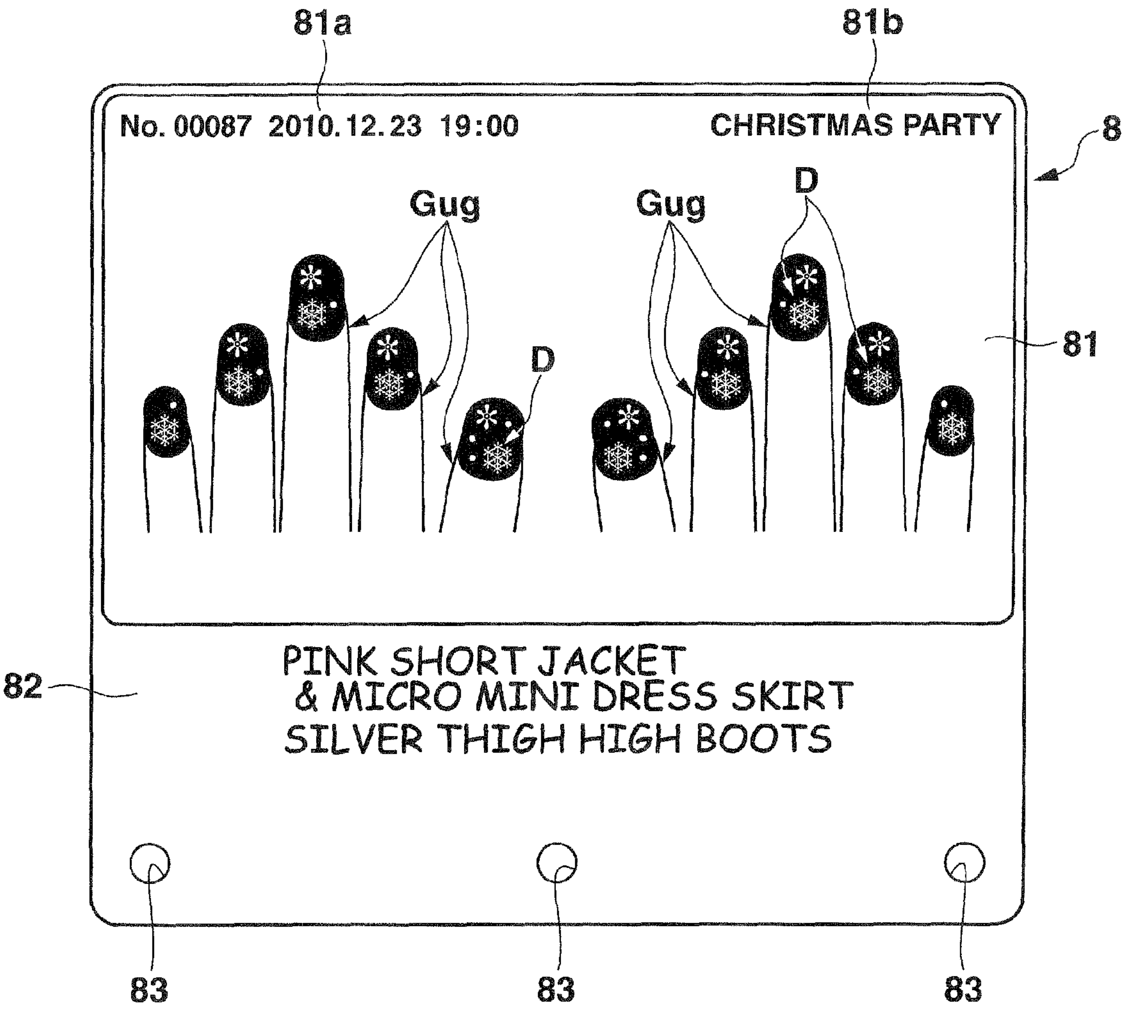
FIG. 22 is a plan view showing another example of the trial printing sheet in this embodiment.

FIGS. 22 to 24 are plan views showing other examples of the trial printing sheet in this embodiment.

For example, as shown in FIG. 22, a fingernail-superimposed image Gug for ten fingers in a state where the same nail design D is implemented individually for those ten fingers of both right and left hands may be arranged while being reduced, and may be printed together with a printing date/time, a comment and the like.

In this case, both of the right and left hands may be taken a photograph in Step S33. Alternatively, after data of only one hand is created, this image and an image as an inversion thereof may be printed in line, whereby an impression in the case where the printing is implemented for the nail portions T of both hands may be shown.

In such a case where printing impressions of a plurality of nail designs D different from one another are desired to be confirmed at a time, then as shown in FIG. 23, then a plurality of the fingernail-superimposed images Gug may be arranged in line so as to be contained in the nail design printing area 81 of the single trial printing sheet 8, and may be printed in a lump.

In this case, the plurality of positionally aligned images Gg are created, in which, for example, a plurality of the different nail designs D are positionally aligned with the nail region At of the same one printing finger U1 (for example, the forefinger of the left hand).

Then, the plurality of fingernail-superimposed images Gug are created, in which the nail designs D concerned are superimposed on the fingernail images Gu of the printing finger U1. The printing control unit 514 arranges the plurality of fingernail-superimposed images Gug in line so that the fingernail-superimposed images Gug can be contained in the nail design printing area 81 of the single trial printing sheet 8, thereby creating the printing image.

In this case, if the design numbers of the respective nail designs D are filled in advance in the additional information printing area 81*c* as shown in FIG. 23, then the design number of the favorite nail design D can be confirmed rapidly when the trial printing sheet 8 is seen later on, and this is convenient for searching the nail deign D desired to be printed, and so on.

As shown in FIG. 24, two images of hands for which the different nail designs D are implemented may be arranged in line while being reduced so as to be contained in the nail design printing area 81 of the single trial printing sheet 8, and then may be printed in a lump.

In this case, two types of fingernail-superimposed images Gug, each of which is for five fingers, for example, in a state where the nail designs D are individually implemented hand by hand, are created. The printing control unit 514 arranges these two types of fingernail-superimposed images Gug in line so that the fingernail-superimposed images Gug can be contained in the nail design printing area 81 of the single trial printing sheet 8, thereby creating the printing image.

Also in this case, if the design numbers of the respective nail designs D are filled in advance in the additional information printing area 81*c* as shown in FIG. 24, then the design number of the favorite nail design D can be confirmed rapidly when the trial printing sheet 8 is seen later on, and this is convenient for searching the nail deign D desired to be printed, and so on.

Note that contents to be printed on the trial printing sheet 8 are not limited to those illustrated here, and by arbitrary setting and the like of the user, it may be made possible to perform printing according to a variety of arrangements.

As described above, in accordance with the nail printing device 1 in this embodiment, such effects as follows are acquired.

That is to say, in this embodiment, the nail design D to be printed on the nail portion T is positionally aligned with the nail region At of the user, whereby the positionally aligned image Gg is created. Then, this positionally aligned image Gg is superimposed on the portion of the nail region At of the fingernail image Gu, whereby the fingernail-superimposed image Gug is created. Then, it is made possible to select the nail printing mode of printing the created positionally aligned image Gg on the nail portion T of the printing finger U1 and the printing medium printing mode of printing the fingernail-superimposed image Gug on the trial printing sheet 8. Therefore, both of the advance trial printing and the printing for the nail portion T can be performed by the single nail printing device 1.

The trial printing can be performed for the printing medium such as paper, and accordingly, when the user desires to consult his/her friend, acquaintance and the like about the nail design D, the user just needs to bring the paper (trial printing sheet 8) and the like, which are subjected to the trial printing. In such a way, even if the user does not bring the nail printing device 1, the user can consult his/her friend, acquaintance and the like about the plurality of nail designs D by showing the same thereto.

The trial printing is performed for the printing medium such as paper before the printing is performed for the nail portion T, whereby it can be determined whether or not the nail design D matches with the user, and so on. Therefore, unlike the case where the printing is directly performed for the nail portion T, the user can be saved from having to remove the selected design by a polish remover in such a case where the user does not like the selected design, and it is not apprehended either that the hands may be roughened, and so on.

In the nail printing mode of performing the printing for the nail portion T, the positionally aligned image Gg is printed, and accordingly, the image matched with the shape of the nail region At of the user can be printed.

On the other hand, in the printing medium printing mode of performing the printing for the trial printing sheet 8, fingernail-superimposed image Gug, in which the positionally aligned image Gg is superimposed on the fingernail image Gu, is printed. Therefore, unlike the case of printing the single nail portion T and the single nail design D, an image close to the impression of the finish in the event of performing the printing for the nail portion T can be printed on the trial printing sheet 8. In such a way, before the selected nail design D is actually printed on the nail portion T, the user can appropriately determine whether or not the color and pattern of the selected nail design D are matched with the fingers of his/her own.

Since the nail design D and the like are actually printed on the printing medium such as paper, the printed image has higher resolution than in the case of displaying the image on the liquid crystal display (LCD) panel and the like with resolution approximately ranging from 160 to 200 dpi. Then, the image, which is close to the actual one in color and has the same resolution (for example, approximately ranging from 600 to 1200 dpi) as that in the actual printing for the nail portion T, can be evaluated/confirmed.

When the nail printing mode is selected, the printing aspect of the printing unit 40 is controlled so that, in the positionally aligned image Gg, the printing pitch in the event of the printing by the printing unit 40 can be finer in the regions equivalent to both end sides in the width direction of the nail portion T than in the region equivalent to the center portion in the width direction thereof. Therefore, even in the case where the printing is performed for the nail portion T in which both ends sides in the width direction are curved in the direction of going away from the printing unit 40, the high-definition image can be printed, in which the distortion does not occur in the nail design D to the end portions thereof, and the density is not lowered therein, either.

When the printing medium printing mode is selected, the printing aspect of the printing unit 40 is controlled so that the printing can be performed in such a manner that, in the fingernail-superimposed image Gug, the pixels are thinned out in the regions equivalent to both end sides of the nail portion T in the positionally aligned image Gg. Therefore, the density on both end sides does not become extremely thick, and on the trial printing sheet 8, the image can be printed, which is substantially similar to the image in which the nail portion T having the nail design D actually printed thereon is viewed from the above.

When the nail printing mode is selected, the printing aspect of the printing unit 40 is controlled so that, for the portion to be subjected to the printing, the printing by the underlying ink can be first performed by using the underlying ink printing head 46*b*. Therefore, even if the printing is performed for the nail portion T in which the base is transparent, the vibrant colors intrinsic to the color inks can be allowed to emerge.

When the printing medium printing mode is selected, the printing aspect of the printing unit 40 is controlled so that the printing can be performed by using only the printing heads 46*a* for the color inks other than white. In the case of using the trial printing sheet 8 that is white, the colors intrinsic to the color inks can be allowed to emerge even if the underlying ink is not used in a similar way to the case of performing the printing for plain paper. On the outlined portion, the white color can be expressed by printing nothing thereon. The printing of the underlying white ink in such a case leads to a waste of the ink, and this is not preferable. In terms of this point, the underling ink is prevented from being used at the time of the printing medium printing mode as in this embodiment, whereby the waste of the ink can be saved.

In this embodiment, the trial printing sheet holding member 6 is provided, which holds the trial printing sheet 8 in the flat state, and in addition, in the event of the printing according to the printing medium printing mode, holds the trial printing sheet 8 at the position where the distance between the printing unit 40 and the surface of the printing medium at the time of the printing according to this printing medium printing mode becomes substantially equal to the distance between the printing unit 40 and the surface of the nail portion T at the time of the printing according to the nail printing mode.

The printing is performed in such a state where the trial printing sheet 8 is held on the trial printing sheet holding member 6, whereby a twist, warp and the like of the trial printing sheet 8 are suppressed and high-definition printing can be performed no matter which the type and material of the trial printing sheet 8 may be. Moreover, the printing for the trial printing sheet 8 can be performed under similar conditions to those in the case of performing the printing for the nail portion T, and accordingly, by such printing medium printing for the trial printing sheet 8, the impression of the finish, which is closer to the state where the printing is performed for the nail portion T, can be confirmed.

In the case where the user selects the plurality of nail designs D, then for all thereof, the positionally aligned image Gg or the fingernail-superimposed images Gug may be created, and displayed on the display screen of the display unit 13, and thereafter, only the image selected by the user from thereamong may be printed on the trial printing sheet 8 in the trial manner. In this case, the print target objects can be narrowed down to only those necessary, and the trial printing sheet 8 can be saved from being wasted.

As shown in FIG. 23 and FIG. 24, in the case where the fingernail images subjected to the plural types of nail designs D are arrayed and printed on the single trial printing sheet 8, the respective nail designs D can be compared with one another and selected on the single trial printing sheet 8.

Even in the case where a single type of the nail design D is printed on the single trial printing sheet 8, the printing medium is paper, and accordingly, a plurality of the trial printing sheets 8 can be carried by hand unlike the case where the nail design D is displayed on the display screen. Then, the plurality of trial printing sheets 8 can be shown to the friend, and the plurality of trial printing sheets 8 can be arrayed and compared with one another, and so on.

In the case of filing the trial printing sheets 8 by using the engagement holes 83 of the trial printing sheets 8, it is easy to select the nail design D for the next time from the filed trial printing sheets 8 so that the nail design D cannot be the same as the nail design D implemented at the previous time, to show the selected nail design D to the friend, and so on. Moreover, the comment and the like are described on the trial printing sheets 8, and accordingly, the trial printing sheets 8 can be used also as a memorial album.

Moreover, on such a trial printing sheet 8, the various pieces of information such as the date/time can be printed, the memorandum can be handwritten, and so on. Accordingly, the date/time when the nail design D concerned is printed, a place where the user goes putting the nail design D thereon, a purpose that the user goes to the place, and so on are handwritten on the trial printing sheet 8, whereby the trial printing sheet 8 can be utilized as a "memorandum list". In such a way, the memorandum list can be taken as a reference at the time of selecting the nail design D later on, and in addition, the same nail design D can be avoided being selected in a duplicate manner, and so on.

Note that, in this embodiment, when the printing is performed according to the nail printing mode, the printing is performed so that, among the positionally aligned image Gg, the printing pitch in the event of the printing by the printing unit 40 can be finer in the regions equivalent to both end sides in the width direction of the nail portion T than in the region equivalent to the center portion in the width direction thereof. Then, for the portion to be subjected to the printing, the printing by the underlying ink is first performed by using the underlying ink printing head 46*b*. When the printing is performed according to the printing medium printing mode, the pixels are thinned out in the regions equivalent to both end sides in the width direction of the nail portion T in the positionally aligned image Gg among the fingernail-superimposed image Gug. Then, the printing is performed by using only the printing heads for the color inks other than white. Such printing aspects as described above are adopted. However, the printing aspects in the nail printing mode and the printing medium printing mode are not limited to these.

Only a part of either of these may be applied, and other printing aspects than these mentioned here may be applied.

In this embodiment, the description has been made of, as an example, the case of using the white trial printing sheet 8 as the printing medium, and using the white ink as the underlying ink. However, the color of the printing medium and the underlying ink is not limited to white.

Although the white ink is preferable as the underlying ink, the underling ink just needs to improve the color emergence of the color inks at the time when the color inks are printed on the nail portion T, and for example, may be of a cream color and the like.

In the case where either one of the printing medium and the underlying ink is not white, then for a portion in which the colors of both are the same, the printing is performed without using the underlying ink in the printing medium printing mode.

In this embodiment, the description has been made of, as an example, the case where the printing is simultaneously performed for the nail portions Ta of the four fingers (forefinger to little finger) of one hand and the nail portion Tb of the thumb of the other hand.

However, the present invention is applicable also to the case where the printing is performed for the printing fingers U1 one by one, and the case where the printing is performed therefor hand by hand.

Alternatively, a configuration may be adopted, in which the printing is simultaneously performed for the nail portions T of the five fingers (thumb to little finger) of one hand.

In this embodiment, as an example, the case is taken, where the first finger positioning portion 201 capable of positioning the four fingers which are the forefinger to the little finger and the second finger positioning portion 202 capable of positioning the thumb are arranged in the printing finger insertion portion 20*a* so as to be shifted from each other in the insertion direction Y of the printing fingers. However, the configuration of the finger positioning portions in the printing finger insertion portion 20*a* is not limited to this.

For example, in the case where the printing is performed for the printing fingers U1 one by one, and the case where the printing is performed therefor hand by hand, then a portion that mounts the printing fingers U1 thereon just needs to be provided in the printing finger insertion portion 20*a*. In this case, it is not necessary to arrange two types of the finger positioning portions so that positions thereof can be shifted from each other.

In this embodiment, the photography unit 30 repeatedly takes a photograph of the inside of the printing finger insertion portion 20*a* at a predetermined time interval. Then, based on the image of the inside of the printing finger insertion portion 20*a*, which is acquired by the photography unit 30, it is determined whether or not the printing fingers are inserted into the printing finger insertion 20*a*. Then, when it is determined that the printing fingers U1 are inserted into the printing finger insertion portion 20*a*, the fingernail image Gu of the printing fingers U1 is acquired, and the printing processing is started. However, a determination method for the timing when the fingernail image Gu of the printing fingers U1 is acquired and the printing processing is started is not limited to this.

For example, when a printing start instruction is inputted from the nail printing start instruction switch button 121*b*, the printing control unit 514 may count an elapsed time since the printing start instruction is inputted, may image the fingernail image Gu of the printing fingers U1 when a predetermined time (for example, ten seconds and the like) elapses, and may start the printing processing.

Note that, even in the case where the configuration is adopted as described above so that the printing processing can be started after the elapse of a predetermined time since the printing start instruction is inputted, a configuration may be adopted, in which, in the case where the printing fingers U1 are printed one by one or hand by hand, control is performed so that the nail printing processing can be started soon after the printing start instruction is inputted from the nail printing start instruction switch button.

In this embodiment, the description has been made of the case of performing, as a simulation, the trial printing for the trial printing sheet 8 before the printing is actually performed for the nail potion T. However, after the nail design D is printed on the nail portion T, the nail design D thus actually printed can be taken a photograph by the photography unit 30, and the image taken a photograph by the photography unit 30 can be printed on the printing medium such as paper.

In such a way, when the favorite nail print can be completed, this can be left as a memorial. Moreover, if the design number and the like are recorded in combination, in the case where the same design D is attempted to be printed at the next time, the nail design D concerned can be searched easily.

Furthermore, such a configuration may be adopted so that the fingernail images of the printing fingers U1 (that is, the images of the printing fingers U1 in which the nail design D is implemented for the nail portions T), which was printed in the past, can be taken a photograph and stored, and that one or a plurality of arbitrary images can be selected from thereamong, and can be printed on the printing medium such as paper. In this case, a plurality of the images may be reduced, and may be printed on the single printing medium.

It is needless to say that, besides the above, the present invention is not limited to this embodiment, and is modifiable as appropriate.

The description has been made above of the embodiment of the present invention; however, the scope of the present invention is not limited to the above-mentioned embodiment, and incorporates the scope of claims described in claims and equivalents to the scope of claims.

What is claimed is:

1. A nail printing device comprising:

a printing unit which includes a printing head that applies ink on a print target surface in accordance with a printing mode, and a control unit which controls the printing unit, wherein the control unit sets the printing mode to one of a nail printing mode and a printing medium printing mode, wherein in the nail printing mode, the control unit: (i) sets a surface of a nail portion as the print target surface, wherein the surface of the nail portion has a curve-shape such that a center portion of the surface swells more than both end sides of the surface along a width direction of the surface of the nail portion, and (ii) creates first nail printing image data for printing on the surface of the nail portion corresponding to the curve-shape of the surface of the nail portion, wherein in the printing medium printing mode, the control unit: (i) creates second nail printing image data for printing on the surface of the nail portion, (ii) sets a planar surface of a printing medium as the print target surface, (iii) performs thinning correction to the second nail printing image data to generate corrected image data, and (iv) controls the printing unit to apply ink on the planar surface of the printing medium corresponding to the corrected image data generated by the thinning correction, and wherein the thinning correction is performed such that a density of ink applied on the planar surface of the printing medium corresponding to the corrected image data is similar to a density of ink when the surface of the nail portion having the curve-shape on which ink is applied corresponding to the second nail printing image data is seen from above.

2. The nail printing device according to claim 1, wherein the printing head intermittently ejects ink droplets obtained by converting the ink into fine droplets while moving, so that the printing head forms on the print target surface a plurality of ink-dots, each of which is made of one or a plurality of the ink droplets and has the ink of a predetermined unit application amount, and a moving distance of the printing head every time when the printing head forms one of the ink-dots on the print target surface is taken as a printing pitch, and wherein in the nail printing mode, the control unit controls the printing pitch of the printing head in accordance with the curve-shape of the surface of the nail portion.

3. The nail printing device according to claim 2, wherein:

original image data corresponding to an original image to be printed on the print target surface is composed of a plurality of pixel data corresponding to a plurality of pixels of the original image data, and in the nail printing mode, the control unit: (i) assigns the pixel data of the original image data in a ratio corresponding to the curve-shape of the surface of the nail portion, (ii) sets a number of pieces of the pixel data to be assigned to regions corresponding to the end sides in the width direction of the nail portion to be larger than a number of pieces of the pixel data to be assigned to a region corresponding to the center portion in the width direction of the nail portion, (iii) creates the first nail printing image data with the assigned pixel data, and (iv) sets the printing pitch corresponding to the number of pieces of the pixel data assigned to the first nail printing image data so that the control unit sets the printing pitch on the end sides in the width direction of the nail portion to be shorter than the printing pitch on the center portion in the width direction of the nail portion.

4. The nail printing device according to claim 2, wherein, in the printing medium printing mode, the control unit thins out a part of pixel data assigned to regions corresponding to the end sides in the width direction of the nail portion of the second nail printing image data in the thinning correction, so that the control unit sets the printing pitch at a time of printing images of the regions corresponding to the end sides of the nail portion to be approximate to the printing pitch at a time of printing an image of a region corresponding to the center portion of the nail portion.

5. The nail printing device according to claim 2, further comprising:

a mounting unit on which a finger having the nail portion is mountable in an orientation along a moving direction of the printing head, and a photography unit which takes a photograph of the finger and the nail portion of the finger mounted on the mounting unit, wherein the control unit includes:

a fingernail image acquisition unit which acquires a fingernail image including the nail portion and a part of the finger being photographed by the photography unit;

a nail region extraction unit which extracts a nail region corresponding to the nail portion from the fingernail image acquired by the fingernail image acquisition unit;

a positionally aligned image creation unit which creates, as the first or second nail printing image data, a positionally aligned image in which an original image to be printed on the nail portion is positionally aligned with a shape of the nail region, and pixel data is assigned corresponding to the curve-shape of the surface of the nail portion; and a fingernail-superimposed image creation unit which creates a fingernail-superimposed image in which the positionally aligned image is superimposed on a portion of the nail region in the fingernail image, wherein in the nail printing mode, the control unit controls the printing pitch, so that the control unit controls the printing unit to perform printing of the positionally aligned image on the surface of the nail portion, and wherein in the printing medium printing mode, the control unit performs the thinning correction, so that the control unit controls the printing unit to perform printing of the fingernail-superimposed image including the positionally aligned image for which the thinning correction is performed, on the planar surface of the printing medium.

6. The nail printing device according to claim 5, further comprising:

a printing finger insertion portion into which at least one finger corresponding to the nail portion to be subjected to the printing is insertable as a printing finger;

a non-printing finger insertion portion into which at least one finger not to be subjected to the printing is insertable as a non-printing finger, wherein the non-printing finger insertion portion is provided below the printing finger insertion portion; and a grip portion which is provided between the printing finger insertion portion and the non-printing finger insertion portion, and which is capable of being sandwiched between the printing finger inserted into the printing finger insertion portion and the non-printing finger inserted into the non-printing finger insertion portion, wherein the printing finger insertion portion is the mounting unit, and the printing medium has a size which enables the printing medium to be inserted into the printing finger insertion portion.

7. The nail printing device according to claim 6, further comprising a printing medium holding member which holds the printing medium on an upper surface thereof, wherein the printing medium holding member has a shape and a size which enable the printing medium holding member to be taken in and out from the printing finger insertion portion, and the printing medium is insertable into the printing finger insertion portion in a state in which the printing medium is held on the upper surface of the printing medium holding member.

8. The nail printing device according to claim 6, wherein the grip portion includes:

a first finger positioning portion which is capable of being sandwiched by the printing finger and the non-printing finger of one of right and left hands, and a second finger positioning portion which is capable of being sandwiched by the printing finger and the non-printing finger of the other of the right and left hands, in a state in which the right and left hands, each of which has the printing finger, are simultaneously inserted into the printing finger insertion portion, and wherein a first end portion of the first finger positioning portion to be sandwiched by the printing finger and the non-printing finger and a second end portion of the second finger positioning portion to be sandwiched by the printing finger and the non-printing finger are located at positions shifted from each other along an insertion direction of the hands.

9. The nail printing device according to claim 6, wherein:

the photography unit takes a photograph of an inside of the printing finger insertion portion, in the nail printing mode, the control unit determines whether or not the printing finger is inserted into the printing finger insertion portion based on the photograph taken by the photography unit, and in the printing medium printing mode, the control unit determines whether or not the printing medium is inserted into the printing finger insertion portion based on the photograph taken by the photography unit.

10. The nail printing device according to claim 1, wherein the printing unit comprises:

a color ink printing head which applies color ink on the print target surface; and an underlying ink printing head which applies underlying ink on the print target surface, wherein in the nail printing mode, the control unit controls the printing unit to perform the printing by using the color ink printing head after applying the underlying ink on the print target surface by using the underlying ink printing head, and wherein in the printing medium printing mode, the control unit controls the printing unit to perform the printing by using only the color ink printing head.

11. The nail printing device according to claim 10, wherein the color ink contains colorant of a color other than white, and the underlying ink contains colorant of a white color.

12. A nail printing device comprising:

a printing unit which includes a printing head that applies ink on a print target surface in accordance with a printing mode;

a printing finger insertion portion into which a finger having a nail portion and a printing medium having a planar surface are insertable;

a photography unit which takes a photograph of a fingernail image which includes the nail portion of the finger and a part of the finger inserted into the printing finger insertion portion; and a control unit, wherein the printing finger insertion portion is made so that a width direction of the nail portion of the finger inserted into the printing finger insertion portion is along a moving direction of the printing head, wherein a surface of the nail portion has a curve-shape along the width direction of the surface of the nail portion, wherein the control unit includes:

a fingernail image acquisition unit which acquires the fingernail image taken by the photography unit;

a nail region extraction unit which extracts a nail region from the fingernail image;

a positionally aligned image creation unit which positionally aligns a nail design to be printed on the nail portion with the nail region, and creates a positionally aligned image corresponding to a shape of the nail region and the curve-shape of the surface of the nail portion; and a fingernail-superimposed image creation unit which creates a fingernail-superimposed image in which the positionally aligned image is superimposed on a portion of the nail region in the fingernail image, wherein the control unit sets the printing mode to one of a nail printing mode and a printing medium printing mode, wherein in the nail printing mode, the control unit sets the surface of the nail portion as the print target surface, wherein in the printing medium printing mode, the control unit: (i) sets the planar surface of the printing medium as the print target surface, (ii) performs thinning correction to the positionally aligned image in the fingernail-superimposed image to generate a corrected positionally aligned image, and (iii) controls to apply ink on the planar surface of the printing medium corresponding to the corrected positionally aligned image generated by the thinning correction, and wherein the thinning correction is performed such that a density of ink applied on the planar surface of the printing medium corresponding to the corrected positionally aligned image is similar to a density of ink when the surface of the nail portion having the curve-shape on which ink is applied corresponding to the positionally aligned image is seen from above.

13. The nail printing device according to claim 12, further comprising a printing medium holding member which holds the printing medium on an upper surface thereof, wherein the printing medium is insertable into the printing finger insertion portion in a state where printing medium is held on the upper surface of the printing medium holding member.

14. A printing control method of a nail printing device which performs printing for a print target surface, the printing control method comprising:

setting a printing mode to one of a nail printing mode and a printing medium printing mode, applying ink on the print target surface by forming a plurality of ink-dots in accordance with the set printing mode, in the nail printing mode, (i) setting a surface of a nail portion as the print target surface, wherein the surface of the nail portion has a curve-shape such that a center portion of the surface swells more than both end sides of the surface along a width direction of the nail portion, and (ii) creating first nail printing image data for printing on the surface of the nail portion corresponding to the curve-shape of the surface of the nail portion, in the printing medium printing mode, (i) creating second nail printing image data for printing on the surface of the nail portion, (ii) setting a planar surface of a printing medium as the print target surface, (iii) performing a thinning correction to the second nail printing image data to generate corrected image data, and (iv) applying ink on the planar surface of the printing medium corresponding to the corrected image data generated by the thinning correction, wherein the thinning correction is performed such that a density of ink applied on the planar surface of the printing medium corresponding to the corrected image data is similar to a density of ink when the surface of the nail portion having the curve-shape on which ink is applied corresponding to the second nail printing image data is seen from above.

15. The printing control method of the nail printing device according to claim 14, further comprising, in the nail printing mode:

composing original image data corresponding to an original image to be printed on the print target surface by a plurality of pixel data corresponding to a plurality of pixels of the original image data, assigning the pixel data of the original image data in a ratio corresponding to the curve-shape of the surface of the nail portion, setting a number of pieces of the pixel data to be assigned to regions corresponding to the end sides in the width direction of the nail portion to be larger than a number of pieces of the pixel data to be assigned to a region corresponding to the center portion in the width direction of the nail portion, creating the first nail printing image data with the assigned pixel data, forming each of a plurality of ink-dots on the surface of the nail portion every time when moving the printing head by a printing pitch, and setting the printing pitch corresponding to the number of pieces of the pixel data assigned to the first nail printing image data, so that the printing pitch on the end sides in the width direction of the nail portion is set to be shorter than the printing pitch on the center portion in the width direction of the nail portion.

16. The printing control method of the nail printing device according to claim 15, further comprising, in the printing medium printing mode, thinning a portion of pixel data assigned to the regions corresponding to the end sides in the width direction of the nail portion of the second nail printing image data in the thinning correction, so that a printing pitch at a time of printing images of the regions corresponding to the end sides of the nail portion is set to be approximate to a printing pitch at a time of printing an image of the region corresponding to the center portion of the nail portion.

17. The printing control method of the nail printing device according to claim 16, further comprising:

acquiring a fingernail image including the nail portion and a part of a finger having the nail portion by taking a photograph of the finger including the nail portion, extracting a nail region corresponding to the nail portion from the fingernail image, creating a positionally aligned image, as the first or the second nail printing image data, by positionally aligning the original image to be printed on the nail portion with a shape of the extracted nail region and assigning the pixel data corresponding to the curve-shape of the surface of the nail portion, creating a fingernail-superimposed image by superimposing the positionally aligned image on a portion of the nail region in the fingernail image, in the nail printing mode, controlling the printing pitch, and printing the positionally aligned image on the surface of the nail portion, and in the printing medium printing mode, performing the thinning correction, and printing the fingernail-superimposed image including the positionally aligned image on which the thinning correction is performed, on the planar surface of the printing medium.

18. A printing control method of a nail printing device which performs printing for a print target surface, the printing control method comprising:

setting a printing mode to one of a nail printing mode and a printing medium printing mode, applying ink on the print target surface by a printing head corresponding to the set printing mode, in the nail printing mode, (i) setting a surface of a nail portion of a finger as the print target surface, wherein the surface of the nail portion has a curve-shape such that a center portion of the surface swells more than both end sides of the surface along a width direction of the nail portion, (ii) taking a photograph of the finger including the nail portion, (iii) acquiring a fingernail image including the nail portion and a part of the finger, (iv) extracting a nail region from the fingernail image corresponding to the nail portion, (v) creating a positionally aligned image corresponding to a shape of the nail region and the curve-shape of the surface of the nail portion by positionally aligning a nail design to be printed on the nail portion with the nail region, and (vi) applying the ink on the surface of the nail portion corresponding to the positionally aligned image while moving a printing head along the width direction, and in the printing medium printing mode, (i) setting a planar surface of a printing medium as the print target surface, (ii) creating a fingernail-superimposed image in which another positionally aligned image is superimposed on a portion of a nail region in another fingernail image, (iii) performing a thinning correction to said another positionally aligned image in the fingernail-superimposed image to generate a corrected another positionally aligned image, and (iv) applying the ink on the planar surface of the printing medium corresponding to the corrected another positionally aligned image generated by the thinning correction, wherein the thinning correction is performed such that a density of ink applied on the planar surface of the printing medium corresponding to the corrected another positionally aligned image is similar to a density of ink when the surface of the nail portion having the curve-shape on which ink is applied corresponding to said another positionally aligned image is seen from above.

19. The printing control method of the nail printing device according to claim 18, further comprising, in the printing medium printing mode, holding the printing medium on an upper surface of a printing medium holding member, and performing printing on the planar surface of the printing medium held on the upper surface of the printing medium holding member.

* * * * *